US009320111B2

(12) United States Patent
Miyake et al.

(10) Patent No.: US 9,320,111 B2
(45) Date of Patent: Apr. 19, 2016

(54) LIGHT-EMITTING DEVICE

(71) Applicant: Semiconductor Energy Laboratory Co., Ltd., Atsugi-shi, Kanagawa-ken (JP)

(72) Inventors: Hiroyuki Miyake, Atsugi (JP); Kenichi Okazaki, Tochigi (JP); Toshiyuki Miyamoto, Kanuma (JP); Masafumi Nomura, Tochigi (JP); Takashi Hamochi, Shimotsuga (JP); Shunpei Yamazaki, Setagaya (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 358 days.

(21) Appl. No.: 13/900,907

(22) Filed: May 23, 2013

(65) Prior Publication Data

US 2013/0320848 A1 Dec. 5, 2013

(30) Foreign Application Priority Data

May 31, 2012 (JP) .................................. 2012-124605

(51) Int. Cl.
*G09G 3/10* (2006.01)
*H05B 37/02* (2006.01)
*G09G 3/32* (2006.01)

(52) U.S. Cl.
CPC .............. *H05B 37/02* (2013.01); *G09G 3/3258* (2013.01); *G09G 2300/043* (2013.01); *G09G 2300/0819* (2013.01); *G09G 2300/0842* (2013.01); *G09G 2320/043* (2013.01); *G09G 2320/045* (2013.01); *Y02B 20/42* (2013.01)

(58) Field of Classification Search
CPC ............ H01L 27/1248; H01L 27/1225; H01L 27/1255; G09G 3/3323; G09G 3/32; G09G 3/10; H05B 37/02

USPC ........ 315/53, 226, 169.1, 169.3; 345/212, 76, 345/690, 82, 90, 99, 204, 92
See application file for complete search history.

(56) References Cited

U.S. PATENT DOCUMENTS

| 6,229,506 B1 | 5/2001 | Dawson et al. |
| 6,229,508 B1 | 5/2001 | Kane |
| 6,359,605 B1 | 3/2002 | Knapp et al. |
| 6,693,388 B2 | 2/2004 | Oomura |

(Continued)

FOREIGN PATENT DOCUMENTS

WO    WO 2004/066249    8/2004

*Primary Examiner* — Lincoln Donovan
*Assistant Examiner* — Thomas Skibinski
(74) *Attorney, Agent, or Firm* — Robinson Intellectual Property Law Office; Eric J. Robinson

(57) ABSTRACT

A light-emitting device that is less influenced by variations in threshold voltage of a transistor is provided. Further, a light-emitting device in which variations in luminance due to variations in threshold voltage of a transistor can be reduced is provided. Further, influences due to variations in threshold voltage of a transistor are corrected in a short time. A light-emitting element, a transistor functioning as a switch supplying current to the light-emitting element, and a circuit in which threshold voltage of the transistor is obtained and voltage between a gate and a source (gate voltage) of the transistor is corrected in accordance with the obtained threshold voltage are included. An n-channel transistor in which threshold voltage changes in a positive direction and the amount of the change is small is used. When the threshold voltage of the transistor is obtained, the gate voltage of the transistor is adjusted as appropriate.

20 Claims, 21 Drawing Sheets

(56) References Cited

U.S. PATENT DOCUMENTS

| | | |
|---|---|---|
| 7,015,882 B2 | 3/2006 | Yumoto |
| 7,030,847 B2 | 4/2006 | Kimura |
| 7,327,357 B2 | 2/2008 | Jeong |
| 7,671,826 B2 | 3/2010 | Kimura |
| 8,164,547 B2 | 4/2012 | Kimura |
| 8,325,111 B2 | 12/2012 | Kimura |
| 8,350,785 B2 | 1/2013 | Kimura |
| 8,432,350 B2 | 4/2013 | Kimura |
| 2006/0082528 A1 | 4/2006 | Guo et al. |
| 2007/0236424 A1* | 10/2007 | Kimura ............... G09G 3/3233 345/76 |
| 2011/0136302 A1* | 6/2011 | Yamazaki ......... H01L 21/28176 438/156 |
| 2012/0113735 A1* | 5/2012 | Kajigaya ............... G11C 7/067 365/203 |
| 2012/0120715 A1* | 5/2012 | Saito ....................... G11C 5/02 365/149 |

* cited by examiner

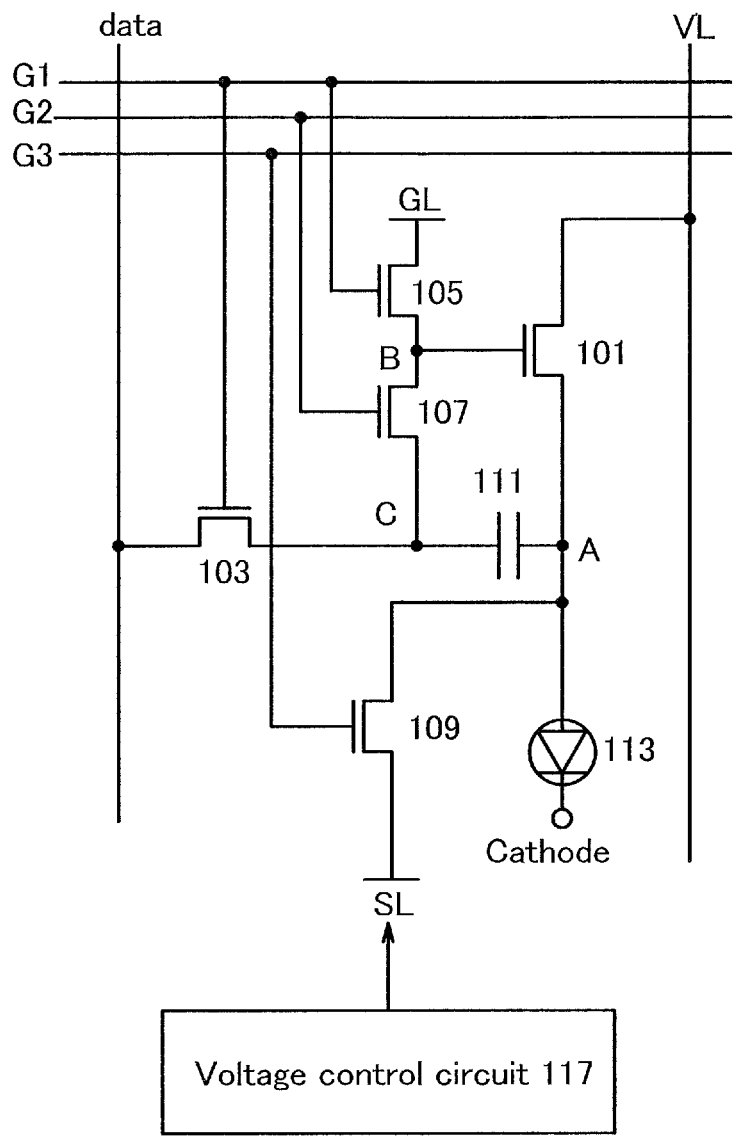

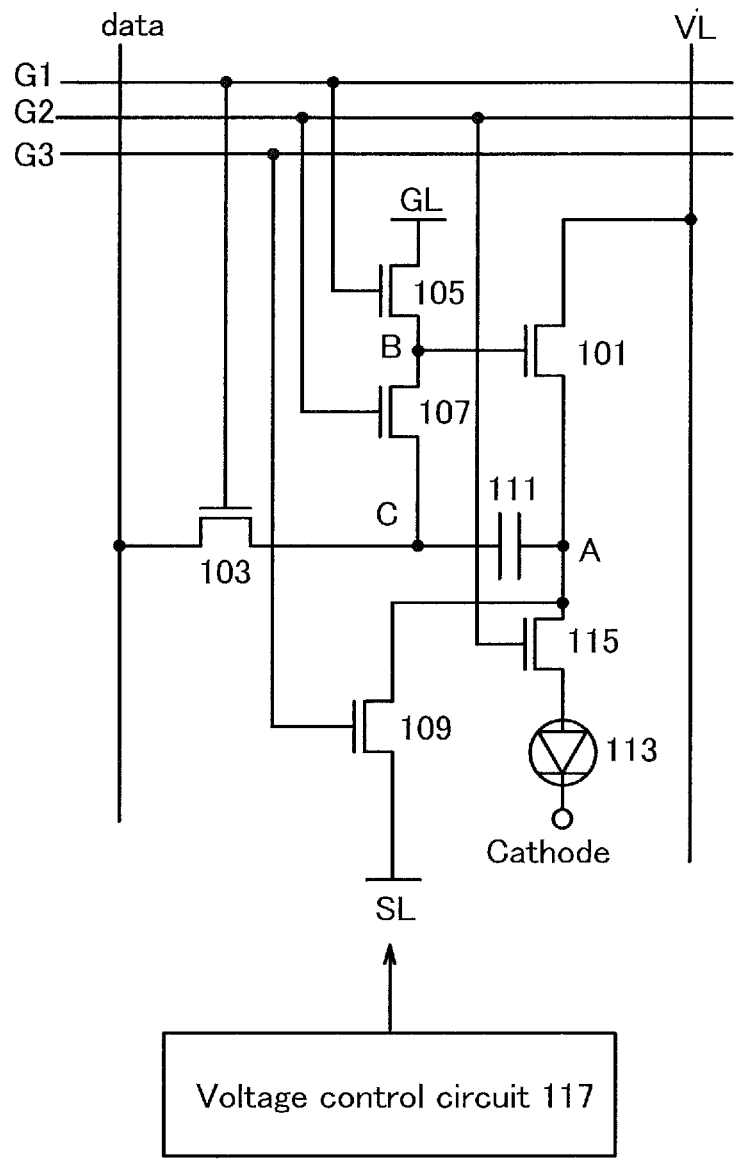

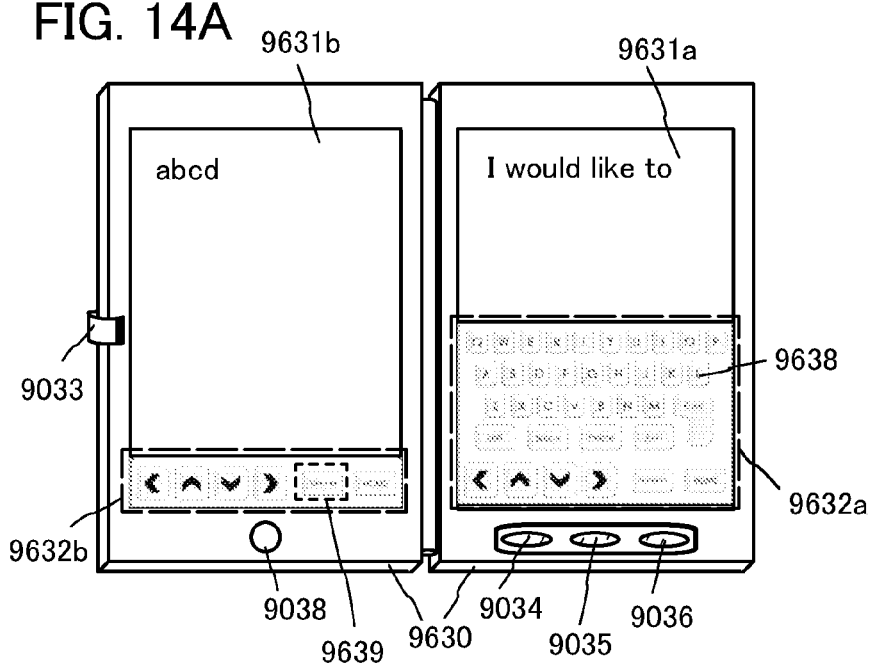
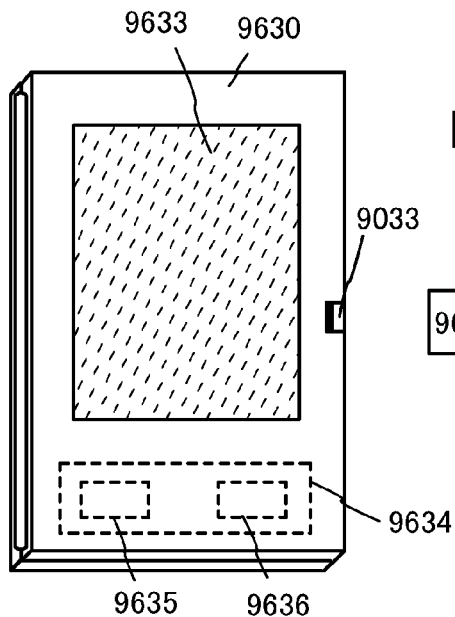
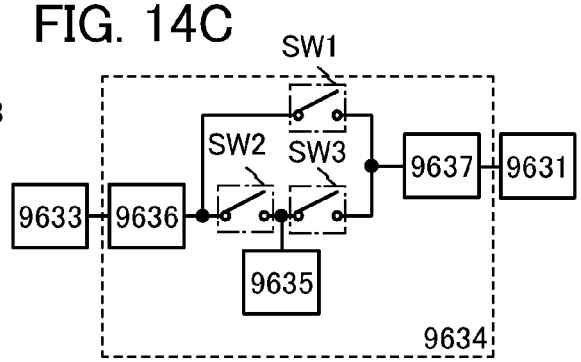

LIGHT-EMITTING DEVICE

BACKGROUND OF THE INVENTION

1. Field of the Invention

One embodiment of the present invention relates to a light-emitting device and a method for driving the light-emitting device.

2. Description of the Related Art

Driving transistors used for most light-emitting devices such as flat panel displays typified by an EL display device are formed using silicon semiconductors such as amorphous silicon, single crystal silicon, and polycrystalline silicon provided over glass substrates.

In recent years, instead of the silicon semiconductor, a technique in which a metal oxide having semiconductor characteristics (an oxide semiconductor) is used for transistors has attracted attention. For example, a technique is disclosed in which a transistor is manufactured using zinc oxide or an In—Ga—Zn-based oxide as an oxide semiconductor and the transistor is used as a switching transistor or the like of a pixel of a display device (see Patent Document 1).

REFERENCE

Patent Document

[Patent Document 1] Japanese Published Patent Application No. 2007-123861

SUMMARY OF THE INVENTION

In a light-emitting device, drain current of a driving transistor is supplied to a light-emitting element. Thus, when the threshold voltage is changed by degradation of the driving transistor, the luminance of the light-emitting element is changed. Note that the degradation of the driving transistor is not evenly caused but is caused in each pixel. Therefore, variations in luminance in the whole light-emitting device occur.

Therefore, in order to improve the image quality of a light-emitting device, it is an important object to propose a pixel structure in which a current value of a driving transistor can be corrected in anticipation of variation in a change in threshold voltage.

In the pixel structure in which the current value of a driving transistor is corrected, it is important to correct the current value of a transistor in a shorter time accurately for increasing the reliability of the light-emitting device.

In view of the above problem, an object of one embodiment of the present invention is to provide a light-emitting device that is less influenced by variations in threshold voltage of transistors. Further, an object of one embodiment of the present invention is to provide a light-emitting device in which variations in luminance can be reduced. Further, an object of one embodiment of the present invention is to correct influences due to variations in the threshold voltage of the transistor in a short time.

A light-emitting element, a transistor functioning as a switch supplying current to the light-emitting element, and a circuit in which threshold voltage of the transistor is obtained and voltage between a gate and a source (gate voltage) of the transistor is corrected in accordance with the obtained threshold voltage are included. An n-channel transistor in which threshold voltage changes in a positive direction and the amount of the change is small is used. When the threshold voltage of the transistor is obtained, the gate voltage of the transistor is adjusted as appropriate.

Therefore, one embodiment of the present invention is a light-emitting device including a light-emitting element, a transistor whose one of a source and a drain is electrically connected to an anode of the light-emitting element, a capacitor whose one electrode is electrically connected to the one of the source and the drain of the transistor and whose other electrode is electrically connected to a gate of the transistor through a first switch, a first wiring electrically connected to the gate of the transistor through a second switch, a second wiring electrically connected to the other electrode of the capacitor through a third switch, a third wiring electrically connected to the one of the source and the drain of the transistor through a fourth switch, and a voltage control circuit electrically connected to the third wiring. The voltage control circuit controls a potential of the third wiring so that the transistor is turned on, drain current flows to the transistor, a potential of the source is increased, and a voltage between the gate and the source is decreased, and a time until the transistor is turned off is shorter than a time for writing data from the second wiring to the capacitor.

Further, another embodiment of the present invention is a light-emitting device including a light-emitting element, a transistor whose one of a source and a drain is electrically connected to an anode of the light-emitting element and the other of the source and the drain is electrically connected to the gate through a first switch, a capacitor whose one electrode is electrically connected to the one of the source and the drain of the transistor through a second switch and whose other electrode is electrically connected to the gate of the transistor, a first wiring electrically connected to the other of the source and the drain of the transistor through a third switch, a second wiring electrically connected to the one electrode of the capacitor through a fourth switch, a third wiring electrically connected to the one of the source and the drain of the transistor through a fifth switch, and a voltage control circuit electrically connected to the first wiring and the third wiring. The voltage control circuit controls potentials of the first wiring and the third wiring so that the transistor is turned on, drain current flows to the transistor, a potential of the source is increased, and a voltage between the gate and the source is decreased, and a time until the transistor is turned off is shorter than a time for writing data from the second wiring to the capacitor.

Note that the voltage control circuit controls a potential of the first wiring and/or a potential of the third wiring so that a difference between the voltage between the gate and the source of the transistor and threshold voltage of the transistor is lower than or equal to 8 V, preferably lower than or equal to 5 V.

As the transistor, a transistor which includes an oxide semiconductor film having a channel formation region and an oxide insulating film containing oxygen at a higher proportion than the stoichiometric composition over the oxide semiconductor film, and whose threshold voltage changes in a positive direction due to a bias-temperature stress test may be used.

Further, the transistor may include a gate electrode, a gate insulating film over the gate electrode, an oxide semiconductor film having a channel formation region, which is over the gate insulating film, a first oxide insulating film which is over the oxide semiconductor film, and a second oxide insulating film containing oxygen at a higher proportion than the stoichiometric composition.

The first oxide insulating film into which and from which oxygen is diffused refers to a film which diffuses oxygen into the oxide semiconductor film through the oxide insulating film. Here, diffusion of oxygen refers to transmission of oxygen in the first oxide insulating film into which and from which oxygen is diffused in addition to transmission of oxygen in the second oxide insulating film containing oxygen at a higher proportion than the stoichiometric composition to the oxide semiconductor film.

Further, in the light-emitting device, as for the oxide semiconductor film, a spin density of a spin in which a signal is found at a g-factor of around 1.93 measured by electron spin resonance is preferably lower than or equal to the lower limit of detection.

A signal found at a g-factor of around 1.93 is derived from oxygen vacancies included in the oxide semiconductor film. Therefore, a spin density of a spin in which a signal is found at a g-factor of around 1.93 measured by electron spin resonance is preferably lower than or equal to the lower limit of detection. Accordingly, defects of electrical characteristics of a transistor, which are derived from oxygen vacancies, can be prevented.

Further, the third wiring is electrically connected to a voltage control circuit including a monitor portion, a corrected data storage portion, and a correction circuit correcting voltage with reference to data in the monitor portion and data in the corrected data storage portion.

Further, the voltage control circuit may include a monitor transistor, a switch determining electric connection between a gate and a drain of the monitor transistor, a capacitor storing a potential between the gate and the drain of the monitor transistor, and a power supply generation circuit generating a potential in accordance with threshold voltage of the monitor transistor.

With one embodiment of the present invention, a light-emitting device that is less influenced by variations in characteristics of transistors can be provided. Further, a light-emitting device in which variations in luminance can be reduced can be provided.

BRIEF DESCRIPTION OF THE DRAWINGS

In the accompanying drawings:
FIG. 1 illustrates a light-emitting device of one embodiment of the present invention;
FIG. 3 illustrates a light-emitting device of one embodiment of the present invention.

FIGS. 14A to 14C each illustrate an example of an electronic device.

DETAILED DESCRIPTION OF THE INVENTION

Figure 2A:
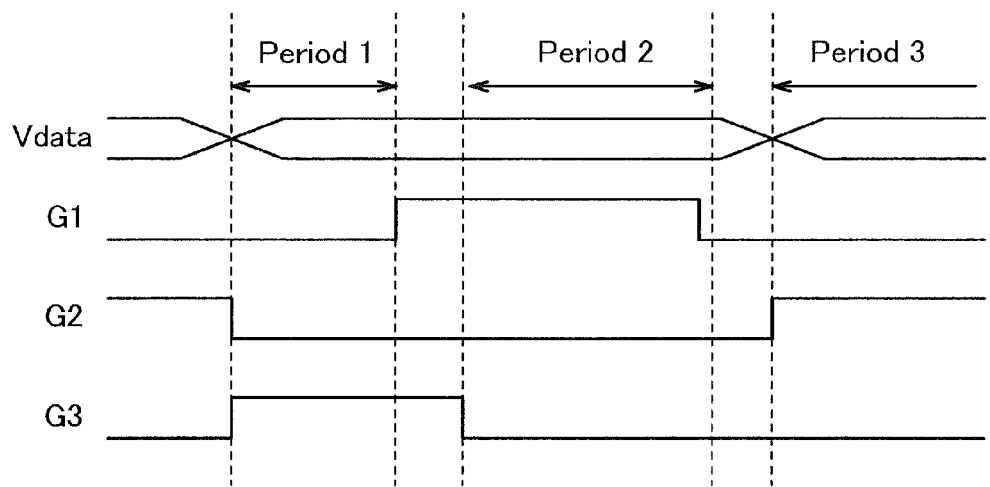
FIGS. 2A and 2B illustrate a method for driving a light-emitting device of one embodiment of the present invention.

Hereinafter, embodiments of the present invention will be described in detail with reference to the accompanying drawings. However, the present invention is not limited to the description below, and it is easily understood by those skilled in the art that modes and details thereof can be modified in various ways. Therefore, the present invention is not construed as being limited to description of the embodiments.

Further, in embodiments hereinafter described, the same parts are denoted with the same reference numerals throughout the drawings. Note that the thickness, width, relative positional relation, and the like of components, i.e., a layer, a region, and the like, which are illustrated in the drawings are exaggerated for clarification of descriptions of the embodiments and example in some cases.

Note that the term such as "over" in this specification and the like does not necessarily mean that a component is placed "directly on" another component. For example, the expression "a gate electrode layer over an insulating layer" does not exclude the case where there is an additional component between the insulating layer and the gate electrode layer. The same applies to the term "below".

In this specification and the like, the term "electrode layer" or "wiring layer" does not limit the function of components. For example, an "electrode layer" can be used as part of a "wiring layer", and the "wiring layer" can be used as part of the "electrode layer". In addition, the term "electrode layer" or "wiring layer" can also mean a combination of a plurality of "electrode layers" and "wiring layers", for example.

Functions of a "source" and a "drain" are sometimes replaced with each other when a transistor of opposite polarity is used or when the direction of current flowing is changed in circuit operation, for example. Therefore, the terms "source" and "drain" can be replaced with each other in this specification.

Note that in this specification and the like, the term "electrically connected" includes the case where components are connected through an object having any electric function. There is no particular limitation on an object having any electric function as long as electric signals can be transmitted and received between components that are connected through the object.

Examples of an "object having any electric function" are an electrode and a wiring. In addition, even when different components are connected to each other in a circuit diagram, there is actually a case where one conductive film has functions of a plurality of components such as a case where part of a wiring serves as an electrode. The term "connection" also means such a case where one conductive film has functions of a plurality of components.

(Embodiment 1)

In this embodiment, a light-emitting device of one embodiment of the present invention is described with reference to drawings. FIG. 1 illustrates a light-emitting device of one embodiment of the present invention.

A light-emitting device 100 which is one embodiment of the present invention includes a transistor 101, a transistor 103, a transistor 105, a transistor 107, a transistor 109, a capacitor 111, a light-emitting element 113, and a voltage control circuit 117.

As the transistor 101, an n-channel transistor whose threshold voltage changes only in a positive direction by a BT stress test or a BT photostress test and in which an amount of the change is small is used. The details of the transistor in which the threshold voltage changes only in a positive direction will be described in an embodiment below. However, a transistor used as the transistor 101 is not limited to the transistor. One of a source and a drain of the transistor 101 is electrically connected to an anode of the light-emitting element 113 and the other of the source and the drain of the transistor 101 is electrically connected to a wiring VL.

Note that the BT stress test is one kind of accelerated test and can evaluate, in a short time, a change in characteristics (i.e., a change over time) of transistors, which is caused by long-term use. In particular, the amount of change in threshold voltage of the transistor between before and after the BT stress test is an important indicator when examining the reliability of the transistor. If the amount of change in the threshold voltage between before and after the BT stress test is small, the transistor has higher reliability.

Next, an example of a specific method of the BT stress test is described. First, initial electrical characteristics (initial characteristics) of the transistor are measured. Next, the temperature of the substrate over which the transistor is formed (substrate temperature) is kept more highly than when the initial characteristics are measured, the pair of electrodes serving as a source and a drain of the transistor are set at the same potential, and the gate electrode is supplied for a certain period with potential different from that of the pair of electrodes serving as the source and the drain. The substrate temperature may be determined as appropriate in accordance with the test purpose. Then, the substrate temperature is set at a temperature similar to that when the initial characteristics are measured, and electrical characteristics of the transistor are measured. As a result, a difference between the threshold voltage in the initial characteristics and the threshold voltage in the electrical characteristics after the BT stress test can be obtained as the amount of change in the threshold voltage.

A BT stress test in the case where the potential applied to the gate electrode is higher than the potentials of the source and the drain is referred to as a positive BT stress test. Further, a BT stress test with light irradiation is referred to as a BT photostress test, and a BT stress test with light irradiation in the case where the potential applied to the gate electrode is higher than the potentials of the source and the drain is referred to as a positive BT photostress test.

Each of the transistor 103, the transistor 105, the transistor 107, and the transistor 109 functions as a switch. The transistor 103 determines conduction or non-conduction between a data line data and one electrode of the capacitor 111. The transistor 105 determines conduction or non-conduction between a gate electrode of the transistor 101 and a power supply line GL. The transistor 107 determines conduction or non-conduction between the one electrode of the capacitor 111 and the gate of the transistor 101. The transistor 109 determines conduction or non-conduction between the one of the source and the drain of the transistor 101 and a potential control line SL and between the anode of the light-emitting element 113 and the potential control line SL. The potential control line SL is electrically connected to the voltage control circuit 117.

The on/off states of the transistor 103 and the transistor 105 are determined by the potential of a wiring G1 connected to gates of the transistor 103 and the transistor 105. The on/off state of the transistor 107 is determined by the potential of a wiring G2 connected to a gate of the transistor 107. The on/off state of the transistor 109 is determined by the potential of a wiring G3 connected to a gate of the transistor 109.

In FIG. 1, in each of the transistor 101, the transistor 103, the transistor 105, the transistor 107, and the transistor 109, the gate is favorably included in an upper side or a lower side of a semiconductor film; however, a pair of gates may be included in the upper side and the lower side of the semiconductor film. When one of the pair of gates is regarded as a back gate, the back gate may be in a floating state or may be in a state where the back gate is supplied with a potential from another element. In the latter case, potentials at the same level may be applied to the normal gate and the back gate, or a fixed potential such as a ground potential may be applied only to the back gate. By controlling the level of a potential applied to the back gate, the threshold voltage of the transistor can be controlled. By providing the back gate, the drain current can be increased in some cases. Further, providing the back gate facilitates formation of a depletion layer in the semiconductor film, which results in a lower subthreshold swing value (S value) in some cases.

Further, in FIG. 1, an example in which the transistor 101, the transistor 103, the transistor 105, the transistor 107, and the transistor 109 are each an n-channel transistor is shown; however, a p-channel transistor can also be used as each of the transistor 101, the transistor 103, the transistor 105, the transistor 107, and the transistor 109.

The voltage control circuit 117 controls a gate voltage of the transistor 101 by determining a potential input to the potential control line SL, whereby the threshold voltage of the transistor 101 can be obtained in a short time. Specifically, when the threshold voltage of the transistor 101 is obtained, a potential of the potential control line SL is preferably controlled so that the difference between the gate voltage of the transistor 101 and the threshold voltage of the transistor 101 is lower than or equal to 8 V, preferably lower than or equal to 5 V. The details of the voltage control circuit 117 will be described in an embodiment below.

The light-emitting element 113 includes an anode, a cathode, and a light-emitting layer containing a light-emitting substance, which is provided between the anode and the cathode. From the light-emitting element 113, electroluminescence is obtained by current supplied when a potential difference between the cathode and the anode, using the potential of the cathode as a reference potential, is higher than or equal to threshold voltage Vthe of the light-emitting element 113. As electroluminescence, there are luminescence (fluorescence) at the time of returning from a singlet-excited state to a ground state and luminescence (phosphorescence) at the time of returning from a triplet-excited state to a ground state.

Alternatively, as a light-emitting element included in the light-emitting device of one embodiment of the present invention, other than an electroluminescent element, a light-emitting element whose brightness, a color tone, polarized light, or the like is changed by supplying current therethrough can be employed.

Next, the operation of the light-emitting device 100 is described.

FIG. 2A is an example of a timing chart of the potentials of the wirings G1 to G3 and a potential Vdata supplied to the data line; the wirings G1 to G3 and the data line are connected to the light-emitting device 100 in FIG. 1. The timing chart in FIG. 2A shows an example in the case where the transistor 101, the transistor 103, the transistor 105, the transistor 107, and the transistor 109 are each an n-channel transistor. As shown in FIG. 2A, the operation of the light-emitting device 100 is mainly divided into three periods.

A period 1 is a period in which a certain potential (a reset potential) is input to the one of the source and the drain of the transistor 101. In the period 1, a low-level potential is applied to the wiring G1, a low-level potential is applied to the wiring G2, and a high-level potential is applied to the wiring G3. Therefore, the transistor 109 is turned on, and an output potential V0 from the voltage control circuit 117 is input from the potential control line SL to the one of the source and the drain of the transistor 101.

A potential Vano is applied to the wiring VL, and a potential Vcat is applied to the cathode of the light-emitting element 113. The potential Vano is higher than the sum of the threshold voltage Vthe of the light-emitting element 113 and the potential Vcat. Further, the potential V0 output from the voltage control circuit 117 is preferably lower than the sum of the threshold voltage Vthe of the light-emitting element 113 and the potential Vcat. With the potential V0 set in the above range, current can be prevented from flowing through the light-emitting element 113 in the period 1.

Next, a period 2 is described. The period 2 is a period in which the threshold voltage of the transistor 101 is obtained and data is written. In the period 2, a high-level potential is applied to the wiring G1, a low-level potential is applied to the wiring G2, and a low-level potential is applied to the wiring G3. Accordingly, the transistors 103 and 105 are turned on and the transistors 107 and 109 are turned off.

During transition from the period 1 to the period 2, the potential applied to the wiring G3 is preferably switched from a high level to a low level after the potential applied to the wiring G1 is switched from a low level to a high level, whereby a change in the potential of the node A due to the switching of the potential applied to the wiring G1 can be prevented.

The potential Vano is applied to the wiring VL, and the potential Vcat is applied to the cathode of the light-emitting element 113. Then, a potential V1 is applied to the power supply line GL and a potential Vdata of an image signal is applied to the data line (data). Note that the potential V1 is preferably higher than the sum of the potential V0 and the threshold voltage Vth of the transistor 101 and lower than the sum of the potential Vano and the threshold voltage Vth of the transistor 101. The potential V0 output from the voltage control circuit 117 is preferably lower than the sum of the potential Vcat and the threshold voltage Vthe of the light-emitting element 113.

By the above operation, the potential V1 higher than the threshold voltage of the transistor 101 is input to the gate (illustrated as a node B) of the transistor 101, whereby the transistor 101 is turned on. Thus, electric charge in the capacitor 111 is discharged through the transistor 101, and the potential of the node A, which is the potential V0, starts to increase. When the potential of the node A finally reaches the potential V1−Vth, that is, when the gate voltage of the transistor 101 is decreased to the threshold voltage Vth of the transistor 101, the transistor 101 is turned off.

When the transistor 101 is turned off, the potential of the one of the source and the drain of the transistor 101 becomes a potential in which the threshold voltage Vth of the transistor 101 is subtracted from the potential of the gate of the transistor 101 (V1, here), that is, V1−Vth.

In this specification, as described above, when the gate voltage of the transistor 101 is set to Vth, "threshold voltage of a transistor is obtained" means that any of the potential of a gate, a source, and a drain of the transistor is set to a potential to which the value of Vth is added.

At this time, the potential Vdata is applied to the one electrode of the capacitor 111 (illustrated as a node C) and the data of the image signal is written to the capacitor. The time for writing the data to the capacitor is not limited, and can be set as appropriate by a practitioner. Note that in the case where the light-emitting device 100 is used for a pixel of a display device such as a display, the time for writing the data to the capacitor is limited in some cases. In particular, for a panel with a large number of pixels, it is necessary to write data to a capacitor in a short period.

Here, the output potential V0 from the voltage control circuit 117 is described.

A gate voltage Vg of the transistor 101 corresponds to the difference between a potential of the node B (denoted by VB) and a potential of the node A (denoted by VA). After the transistor 101 is turned on, electric charge of the capacitor 111 is discharged through the transistor 101 and VA starts to increase.

Figure 2B:
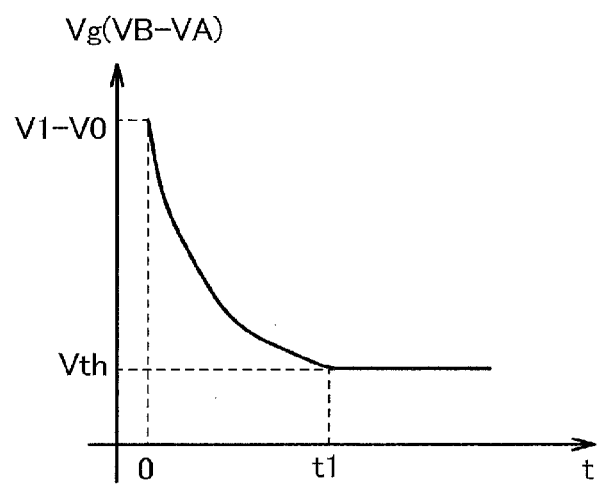

In FIG. 2B, transition of the gate voltage Vg of the transistor 101 at this time is shown. In FIG. 2B, the vertical axis represents the gate voltage Vg of the transistor 101 (here, VB−VA), and the horizontal axis represents time with "0" indicating the time when the transistor 101 is turned on. As shown in FIG. 2B, the initial value of the gate voltage of the transistor 101 (VB−VA), that is, the gate voltage Vg of the transistor 101 at the time when the transistor 101 is turned on (t=0), corresponds to the difference between the potential V1 input to the gate of the transistor 101 and the potential V0 input to the source of the transistor 101. When the transistor 101 is turned on, VA is increased and the value of the gate voltage Vg of the transistor 101 (VB−VA) is decreased. When the gate voltage is decreased to the threshold voltage Vth of the transistor 101, the transistor 101 is turned off, so that the increase in the potential of VA is stopped and the decrease in the gate voltage Vg of the transistor 101 (VB−VA) is also stopped.

Therefore, in order to obtain the threshold voltage of the transistor 101, as shown in FIG. 2B, the initial value of VB−VA (V1−V0) should be higher than the threshold voltage Vth of the transistor 101.

Thus, the initial value of VB−VA (V1−V0) needs to be set to a value higher than the threshold voltage of the transistor 101 in consideration of a change in the threshold voltage of the transistor in advance so that the threshold voltage of the transistor 101 can be obtained even when the threshold voltage of the transistor 101 is changed.

However, the time required for obtaining the threshold voltage of the transistor 101 corresponds to a period in which the potential of VA is increased and VB−VA becomes the threshold voltage Vth of the transistor 101 (t1 shown in FIG. 2B); therefore, in the case where the initial value of VB−VA (V1−V0) of the transistor 101 is increased, it takes a long time to obtain the threshold voltage of the transistor 101.

Further, in the case where obtaining of the threshold voltage of the transistor and writing of the potential of the data line to the capacitor are performed at the same time as in the light-emitting device in this embodiment, a period for obtaining the threshold voltage is also limited in some cases in addition to the time for writing the data. When the period for obtaining the threshold voltage is limited, in the case where V1−V0 is high, there is a possibility that the threshold voltage is not obtained correctly in the period.

Therefore, in the light-emitting device of one embodiment of the present invention, in order to obtain the threshold voltage of the transistor 101 in a short time, the potential V0 is controlled by the voltage control circuit 117 so that the gate voltage initially applied to the transistor 101, that is, V1−V0 here, is set to a value as close to the threshold voltage of the transistor 101 as possible. Specifically, the potential V0 is preferably set as appropriate so that the difference between V1−V0 and the threshold voltage of the transistor 101 is lower than or equal to 8 V, preferably lower than or equal to 5 V.

The output potential from the voltage control circuit 117, that is, the potential (V0) input to the one of the source and the drain of the transistor 101, is controlled in accordance with the change in the threshold voltage of the transistor 101, whereby the time required for obtaining the threshold voltage is shortened and the correct threshold voltage can be obtained.

In the case where a transistor in which the threshold voltage changes only in a positive direction in the BT stress test is used as the transistor 101, the potential V0 output from the voltage control circuit 117 may be set to a low value in accordance with the change in the threshold voltage of the transistor. By using the transistor in which the threshold voltage changes only in a positive direction, the amount of the change in the threshold voltage of the transistor is easily estimated; thus, V0 can be easily controlled.

Further, as the transistor 101, a transistor in which the amount of the change in the threshold voltage is small is preferably used. Specifically, the amount of the change in the threshold voltage of the transistor 101 is preferably lower than or equal to 2.5 V, preferably lower than or equal to 0.5 V. In the case where the amount of the change in the threshold voltage of the transistor 101 is small, the threshold voltage can be obtained correctly for a long period.

Next, a period 3 is described. In the period 3, current flows into the light-emitting element so that the light-emitting element emits light. In the period 3, a low-level potential is applied to the wiring G1, a high-level potential is applied to the wiring G2, and a low-level potential is applied to the wiring G3. Accordingly, the transistor 107 is turned on and the transistors 101, 103, 105, and 109 are turned off.

During transition from the period 2 to the period 3, the potential applied to the wiring G2 is preferably switched from a low level to a high level after the potential applied to the wiring G1 is switched from a high level to a low level, whereby a change in the potential of the node A due to the switching of the potential applied to the wiring G1 can be prevented.

The potential Vano is applied to the wiring VL, and the potential Vcat is applied to the cathode of the light-emitting element 113.

The potential Vdata is applied to the node B by the above operation; thus, the gate voltage of the transistor 101 becomes Vdata−V1+Vth. Thus, the gate voltage of the transistor 101 can be the value to which the threshold voltage Vth is added. By the operation, a change in the threshold voltage Vth of the transistor 101 can be prevented from affecting a current value supplied to the light-emitting element 113. Alternatively, even if the transistor 101 deteriorates and the threshold voltage Vth is changed, the change in the threshold voltage Vth can be prevented from affecting the current value supplied to the light-emitting element 113. Accordingly, the influence of variation in luminance (display unevenness) in the whole light-emitting device can be reduced and high-quality images can be displayed.

Further, a light-emitting device 200 which is another embodiment of the present invention is shown in FIG. 3. The light-emitting device 200 includes a transistor 101, a transistor 103, a transistor 105, a transistor 107, a transistor 109, a transistor 115, a capacitor 111, and a light-emitting element 113.

The light-emitting device 200 is different from the light-emitting device 100 in that the transistor 115 is inserted between the one of the source and the drain of the transistor 101 and the anode of the light-emitting element 113. Note that, in the light-emitting device 200, portions that are similar to the portions in the light-emitting device 100 are denoted by the same reference numerals, and detailed description thereof is omitted.

The transistor 115 functions as a switch which determines conduction or non-conduction between the transistor 101 and the light-emitting element 113. A gate of the transistor 115 is connected to the wiring G2, and the on/off state of the transistor 115 is determined by the potential of the wiring G2.

Next, the operation of the light-emitting device 200 illustrated in FIG. 3 is described.

Figure 4:
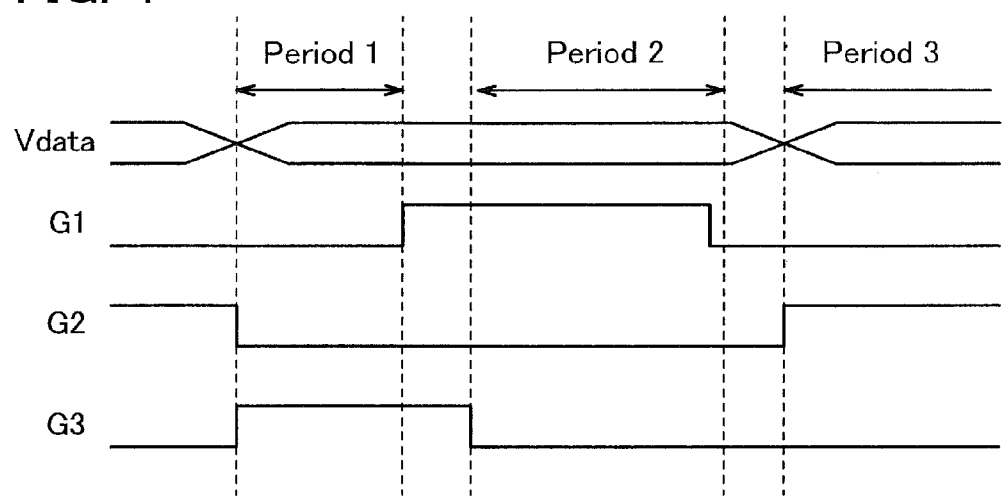
FIG. 4 illustrates a method for driving a light-emitting device of one embodiment of the present invention.

FIG. 4 is an example of a timing chart of the potentials of the wirings G1 to G3 and the potential Vdata supplied to the data line; the wirings G1 to G3 and the data line are connected to the light-emitting device 200 in FIG. 3. The timing chart in FIG. 4 shows an example in the case where the transistor 101, the transistor 103, the transistor 105, the transistor 107, the transistor 109, and the transistor 115 are each an n-channel transistor.

First, in a period 1, a low-level potential is applied to the wiring G1, a low-level potential is applied to the wiring G2, and a high-level potential is applied to the wiring G3. Accordingly, only the transistor 109 is turned on, and the other transistors are turned off. Since the transistor 109 is turned on, the output potential V0 from the voltage control circuit 117 is input to the one of the source and the drain of the transistor 101 and the other electrode of the capacitor 111 (illustrated as the node A).

The potential Vano is applied to the wiring VL, and the potential Vcat is applied to the cathode of the light-emitting element 113. The potential Vano is higher than a potential which is the sum of the threshold voltage Vthe of the light-emitting element 113 and the potential V0.

Next, a period 2 is described. In the period 2, a high-level potential is applied to the wiring G1, a low-level potential is applied to the wiring G2, and a low-level potential is applied to the wiring G3. Accordingly, the transistors 103 and 105 are turned on and the transistors 107, 109, and 115 are turned off.

During transition from the period 1 to the period 2, the potential applied to the wiring G3 is preferably switched from a high level to a low level after the potential applied to the wiring G1 is switched from a low level to a high level, whereby a change in the potential of the node A due to the switching of the potential applied to the wiring G1 can be prevented.

The potential Vano is applied to the wiring VL, and the potential Vcat is applied to the cathode of the light-emitting element 113. Then, the potential Vdata of the image signal is applied to the data line (data). Note that the potential V1 is preferably higher than the sum of the potential V0 and the threshold voltage Vth of the transistor 101 and lower than the sum of the potential Vano and the threshold voltage Vth of the transistor 101.

A value of the potential V0 of the light-emitting device 200 in the period 2 can be set to a value similar to that of the light-emitting device 100; therefore, detailed description thereof is omitted. The light-emitting device 200 is different from the light-emitting device 100 in that the transistor 115 is inserted between the transistor 101 and the light-emitting element 113. Even when the value higher than the sum of the potential Vcat and the threshold voltage Vthe of the light-emitting element is input to the potential V0, the light-emitting element 113 does not emit light as long as the transistor 115 is off. Thus, the allowable potential V0 range can be expanded and the allowable range of V1−V0 can also be increased. The degree of freedom of the allowable range of V1−V0 is increased; thus, the time required for obtaining the threshold voltage can be further shortened. As a result, a light-emitting device with high reliability, in which the correct threshold voltage can be obtained even when the period for obtaining the threshold voltage is limited, can be achieved.

By the above operation, the potential V1 higher than the threshold voltage of the transistor 101 is input to the gate (illustrated as the node B) of the transistor 101, whereby the transistor 101 is turned on. Thus, electric charge in the capacitor 111 is discharged through the transistor 101, and the potential of the node A, which is the potential V0, starts to increase. When the potential of the node A finally reaches the potential V1−Vth, that is, when a potential difference between the gate and the drain of the transistor 101 (gate voltage) is decreased to the threshold voltage Vth of the transistor 101, the transistor 101 is turned off.

When the transistor 101 is turned off, the potential of the one of the source and the drain of the transistor 101 becomes a potential in which the threshold voltage of the transistor 101 is subtracted from the potential of the gate of the transistor 101 (V1, here), that is, V1−Vth. The potential Vdata is applied to the one electrode of the capacitor 111 (illustrated as the node C).

Next, a period 3 is described. In the period 3, current flows into the light-emitting element 113 so that the light-emitting element 113 emits light. In the period 3, a low-level potential is applied to the wiring G1, a high-level potential is applied to the wiring G2, and a low-level potential is applied to the wiring G3. Accordingly, the transistors 107 and 115 are turned on, and the transistors 101, 103, 105, and 109 are turned off.

During transition from the period 2 to the period 3, the potential applied to the wiring G2 is preferably switched from a low level to a high level after the potential applied to the wiring G1 is switched from a high level to a low level, whereby a change in the potential of the node A due to the switching of the potential applied to the wiring G1 can be prevented.

The potential Vano is applied to the wiring VL, and the potential Vcat is applied to the cathode of the light-emitting element 113.

The potential Vdata is applied to the node B by the above operation; thus, the gate voltage of the transistor 101 becomes Vdata−V1+Vth. Thus, the gate voltage of the transistor 101 can be the value to which the threshold voltage Vth is added. By the above operation, a change in the threshold voltage Vth of the transistor 101 can be prevented from affecting a current value supplied to the light-emitting element 113. Alternatively, even if the transistor 101 deteriorates and the threshold voltage Vth is changed, the change in the threshold voltage Vth can be prevented from affecting the current value supplied to the light-emitting element 113. Accordingly, the influence of variation in luminance (display unevenness) in the whole light-emitting device can be reduced and high-quality images can be displayed.

Note that the potential applied to the wiring G2 is greatly varied here, whereby an influence of a change in threshold voltage of the transistor 115 on the current value supplied to the light-emitting element 113 can be prevented. In other words, the high-level potential applied to the wiring G2 is much higher than the threshold voltage of the transistor 115, and the low-level potential applied to the wiring G2 is much lower than the threshold voltage of the transistor 115; thus, on/off switching of the transistor 115 is secured and the influence of the change in the threshold voltage of the transistor 115 on the current value supplied to the light-emitting element 113 can be prevented.

In the light-emitting device of this embodiment, threshold voltage of a transistor which supplies current to a light-emitting element is obtained and a gate voltage of the transistor is set to a voltage to which the threshold voltage of the transistor is added, whereby an influence of changes in the threshold voltage of the transistor can be reduced. In addition, a voltage between a gate and a source of the transistor is controlled when the threshold voltage is obtained, whereby a time required for obtaining the threshold voltage can be shortened. The threshold voltage can be obtained correctly in a short time; thus, a light-emitting device with high reliability can be achieved.

This embodiment can be implemented in appropriate combination with any of the other embodiments.

(Embodiment 2)

In this embodiment, a light-emitting device of another embodiment of the present invention is described with reference to drawings. Note that, in this embodiment, portions that are similar to the portions in Embodiment 1 are denoted by the same reference numerals, and detailed description thereof is omitted.

Figure 5:
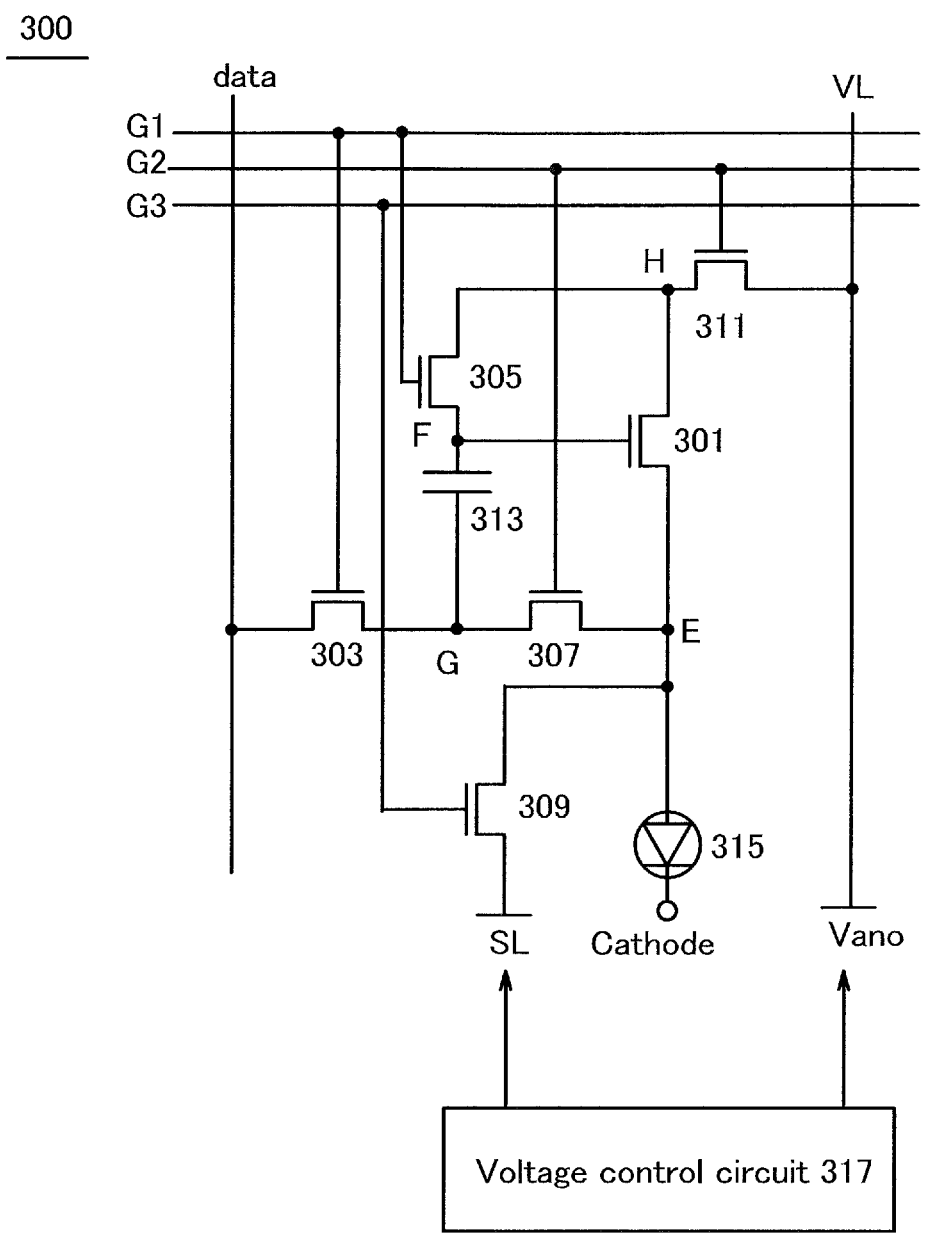
FIG. 5 illustrates a light-emitting device of one embodiment of the present invention.

FIG. 5 illustrates a light-emitting device of one embodiment of the present invention. A light-emitting device 300 which is one embodiment of the present invention includes a transistor 301, a transistor 303, a transistor 305, a transistor 307, a transistor 309, a transistor 311, a capacitor 313, and a light-emitting element 315.

As the transistor 301, an n-channel transistor in which the threshold voltage changes only in a positive direction by a BT stress test or a BT photostress test and an amount of the change in the threshold voltage is smaller than or equal to 2.5 V. The details of the transistor in which the threshold voltage changes only in a positive direction will be described in an embodiment below. A transistor used as the transistor 301 is not limited to the transistor. One of a source and a drain of the transistor 301 is electrically connected to an anode of the light-emitting element 315 and a gate of the transistor 301 is electrically connected to one electrode of the capacitor 313.

Each of the transistor 303, the transistor 305, the transistor 307, the transistor 309, and the transistor 311 functions as a switch. The transistor 303 determines conduction or non-conduction between a data line data and the other electrode of the capacitor 313 and between the data line data and one of a source and a drain of the transistor 307. The transistor 305 determines conduction or non-conduction between a gate of the transistor 301 and the other of the source and the drain of the transistor 301. The transistor 307 determines conduction or non-conduction between the other electrode of the capacitor 313 and the one of the source and the drain of the transistor 301. The transistor 309 determines conduction or non-conduction between the one of the source and the drain of the transistor 301 and a potential control line SL and between the anode of the light-emitting element 315 and the potential control line SL. The transistor 311 determines conduction or non-conduction between the other of the source and the drain of the transistor 301 and a wiring VL.

The on/off state of the transistor 303 and the transistor 305 are determined by the potential of a wiring G1 connected to gates of the transistor 303 and the transistor 305. The on/off states of the transistor 307 and the transistor 311 are determined by the potential of a wiring G2 connected to gates of the transistor 307 and the transistor 311. The on/off state of the transistor 309 is determined by the potential of a wiring G3 connected to a gate of the transistor 309.

In FIG. 5, in each of the transistor 301, the transistor 303, the transistor 305, the transistor 307, the transistor 309, and the transistor 311, the gate is favorably included in an upper side or a lower side of a semiconductor film; however, a pair of gates may be included in the upper side and the lower side of the semiconductor film. When one of the pair of gates is regarded as a back gate, the back gate may be in a floating state or may be in a state where the back gate is supplied with a potential from another element. In the latter case, potentials at the same level may be applied to the normal gate and the back gate, or a fixed potential such as a ground potential may be applied only to the back gate. By controlling the level of a potential applied to the back gate, the threshold voltage of the transistor can be controlled. By providing the back gate, a channel formation region is enlarged and the drain current can be increased. Moreover, providing the back gate facilitates formation of a depletion layer in the semiconductor film, which results in a lower S value.

Further, in FIG. 5, an example in which the transistor 301, the transistor 303, the transistor 305, the transistor 307, the transistor 309, and the transistor 311 are each an n-channel transistor is shown; however, a p-channel transistor can also be used as each of the transistor 301, the transistor 303, the transistor 305, the transistor 307, the transistor 309, and the transistor 311.

The voltage control circuit 317 is electrically connected to the potential control line SL and the wiring VL, and the voltage control circuit 317 inputs the potential V0 and the potential Vano to the potential control line SL and the wiring VL, respectively.

The voltage control circuit 317, similarly to the voltage control circuit 117 described in Embodiment 1, controls a gate voltage of the transistor 301 by determining a potential input to the potential control line SL and the wiring VL, whereby the threshold voltage of the transistor 301 can be obtained in a short time. Specifically, when the threshold voltage of the transistor 301 is obtained, the potential V0 and the potential Vano which are input to the potential control line SL and the wiring VL, respectively, are controlled so that the difference between the gate voltage of the transistor 301 and the threshold voltage of the transistor 301 is lower than or equal to 8 V, preferably lower than or equal to 5 V.

The details of the voltage control circuit 317 will be described in an embodiment below.

The light-emitting element 315 can have a structure similar to the light-emitting element 113 in Embodiment 1.

Next, the operation of the light-emitting device 300 in FIG. 5 is described.

Figure 6A:
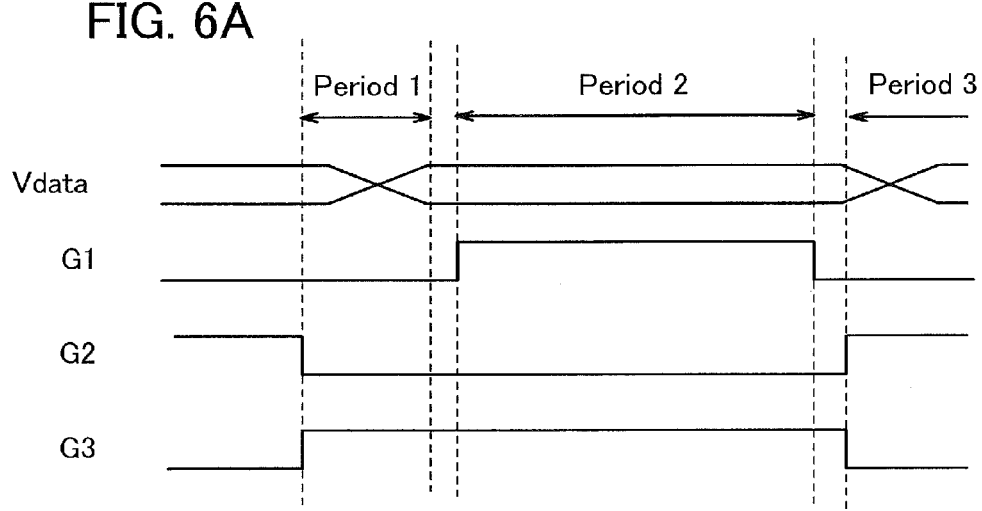
FIGS. 6A and 6B illustrate a method for driving a light-emitting device of one embodiment of the present invention.

FIG. 6A is an example of a timing chart showing the potentials of the wirings G1 to G3 and a potential Vdata supplied to the data line; the wirings G1 to G3 and the data line are connected to the light-emitting device 300 in FIG. 5. The timing chart in FIG. 6A shows an example in the case where the transistor 301, the transistor 303, the transistor 305, the transistor 307, the transistor 309, and the transistor 311 are each an n-channel transistor.

The operation of the light-emitting device 300 has the same three periods as the light-emitting device 100 and the light-emitting device 200 described in Embodiment 1 and a precharge period before the period 1 in which a certain potential (a reset potential) is input to the one of the source and the drain of the transistor 301.

In the precharge period, a low-level potential is applied to the wiring G1, a high-level potential is applied to the wiring G2, and a low-level potential is applied to the wiring G3. Accordingly, the transistors 307 and 311 are turned on.

The potential Vano is applied to the wiring VL, and the potential Vcat is applied to a cathode of the light-emitting element 315. The potential V0 is applied to the potential control line SL. Here, the potential V0 is preferably lower than the sum of the potential Vcat and the threshold voltage Vthe of the light-emitting element 315. Further, the potential Vano is preferably higher than a potential that is the sum of the potential V0 and the potential of the threshold voltage Vth of the transistor 301.

By turning on the transistor 311, the potential Vano input to the wiring VL is input to a node (denoted by the node H) formed by the other of the source and the drain of the transistor 311 and one of a source and a drain of the transistor 305.

Next, a period 1 is described. In the period 1, a low-level potential is applied to the wiring G1, a low-level potential is applied to the wiring G2, and a high-level potential is applied to the wiring G3. Accordingly, only the transistor 309 is turned on, and the other transistors are turned off. The transistor 309 is turned on, whereby the output potential V0 from the voltage control circuit 317 is input to the one of the source and the drain of the transistor 301 and the other electrode of the light-emitting element 315 (illustrated as the node E). Further, the transistor 311 is turned off, whereby the potential Vano is held in the node F.

Further, the potential Vcat is applied to the cathode of the light-emitting element 315. Here, the potential V0 is preferably lower than the sum of the potential Vcat and the threshold voltage Vthe of the light-emitting element 315.

Next, a period 2 is described. In the period 2, a high-level potential is applied to the wiring G1, a low-level potential is applied to the wiring G2, and a high-level potential is applied to the wiring G3. Accordingly, the transistors 303, 305, and 309 are turned on.

The potential Vcat is applied to the cathode of the light-emitting element 315, and the potential Vdata of the image signal is applied to the data line (data). The potential V0 is applied to the potential control line SL. Note that the potential V0 is preferably lower than the sum of the potential Vcat and the threshold voltage Vthe of the light-emitting element 315.

By the above operation, the potential Vano held in the node F is input to the gate of the transistor 301, so that the transistor 301 is turned on and drain current flows. Further, the gate and the drain of the transistor 301 becomes a floating state. Then, at the same time as the drain current flows, the potential of the gate of the transistor 301 is decreased and the gate voltage of the transistor 301 is decreased to the threshold voltage Vth of the transistor 301, so that the transistor 301 is turned off. At this time, the potential V0 is input to the one of the source and the drain of the transistor 301; thus, the potential of the gate of the transistor 301 becomes V0+Vth.

Here, the transistor 305 is on; thus, the potential V0+Vth of the gate of the transistor 301 is input to the one electrode of the capacitor 313. Further, the potential Vdata is applied to the other electrode of the capacitor 313 (illustrated as the node G).

Here, the potential V0 and the potential Vano input from the voltage control circuit 317 are described.

When the transistor 301 is turned on, the gate voltage of the transistor 301 corresponds to the difference between a potential of the node F (denoted by VF) and a potential of the node E (denoted by VE). After that, the potential of the gate of the transistor 301 (=VF) is decreased.

Figure 6B:
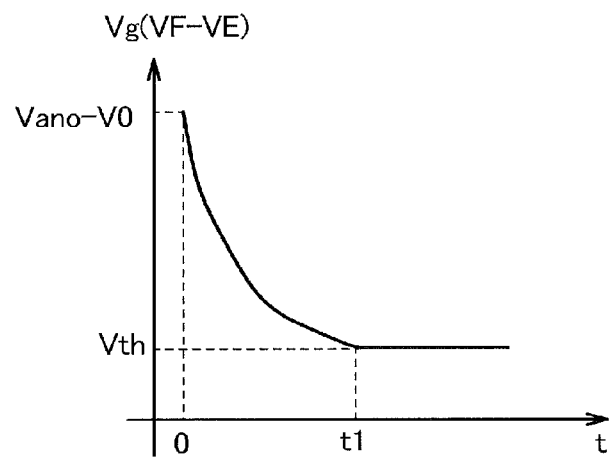

In FIG. 6B, transition of the gate voltage Vg of the transistor 301 (here, VF−VE) at this time is shown. In FIG. 6B, the vertical axis represents the gate voltage Vg of the transistor 301 (VF−VE), and the horizontal axis represents the time with "0" indicating the time when the transistor 301 is turned on. As shown in FIG. 6B, the initial value of the gate voltage Vg of the transistor 301 (VF−VE), that is, the gate voltage Vg of the transistor 301 at the time when the transistor 301 is turned on, corresponds to the difference between the potential Vano of the node F and the potential V0 input to the one of the source and the drain of the transistor 301. When the transistor 301 is turned on, VF is decreased by flowing the drain current and the value of the gate voltage Vg of the transistor 301 (VF−VE) is decreased. When the gate voltage of the transistor 301 is decreased to the threshold voltage Vth of the transistor 301, the transistor 301 is turned off, so that the decrease in the potential of VF is stopped and the decrease in the gate voltage Vg of the transistor 301 (VF−VE) is also stopped.

Therefore, similarly to the initial value V1−V0 of the gate voltage of the transistor 101 described in Embodiment 1, the initial value Vano−V0 should also be higher than the threshold voltage Vth of the transistor 301, and is preferably set to a value as close to the threshold voltage of the transistor 301 as possible. Therefore, the voltage control circuit 317 may be set to output each potential so that the difference between Vano−V0 and the threshold voltage of the transistor 301 is lower than or equal to 8 V, preferably lower than or equal to 5 V.

Note that a driving method in which one of the potential Vano and the potential V0 is set to a fixed potential and the other thereof is changed or a driving method in which both the potential Vano and the potential V0 are changed may be employed.

In the case where the potential V0 is changed, the potential Vdata of the data line also needs to be changed in accordance with the change in the potential V0.

Next, a period 3 is described. In the period 3, current flows into the light-emitting element 315 so that the light-emitting element 315 emits light. In the period 3, a low-level potential is applied to the wiring G1, a high-level potential is applied to the wiring G2, and a low-level potential is applied to the wiring G3. Accordingly, the transistors 307 and 311 are turned on.

During transition from the period 2 to the period 3, it is preferable that the potential applied to the wiring G3 be switched from a high level to a low level after the potential applied to the wiring G1 be switched from a high level to a low level, and then, the potential applied to the wiring G2 be switched from a low level to a high level. By the above operation, a change in the potential of the node B and the node C due to switching of the potentials applied to the wirings G1 to G3 can be prevented.

The potential Vano is applied to the wiring VL, and the potential Vcat is applied to the cathode of the light-emitting element 315.

The transistor 307 is turned on, whereby the potential Vdata of the node G is applied to the one of the source and the drain of the transistor 301; therefore, the gate voltage of the transistor 301 becomes V0+Vth−Vdata. Thus, the gate voltage of the transistor 301 can be the value to which the threshold voltage Vth is added. By the above operation, a change in the threshold voltage Vth of the transistor 301 can be prevented from affecting a current value supplied to the light-emitting element 315. Alternatively, even if the transistor 301 deteriorates and the threshold voltage Vth is changed, the change in the threshold voltage Vth can be prevented from affecting the current value supplied to the light-emitting element 315. Accordingly, the influence of variation in luminance (display unevenness) in the whole light-emitting device can be reduced and high-quality images can be displayed.

In the light-emitting device of this embodiment, threshold voltage of a transistor which supplies current to a light-emitting element is obtained and a gate voltage of the transistor is set to a voltage to which the threshold voltage of the transistor is added, whereby an influence of changes in the threshold voltage of the transistor can be reduced. In addition, a voltage between a gate and a source of the transistor is controlled when the threshold voltage is obtained, whereby a time required for obtaining the threshold voltage can be shortened. By shortening the time required for obtaining the threshold voltage, the threshold voltage can be obtained correctly in a short time even in the case where the time required for obtaining the threshold voltage is limited; thus, a light-emitting device with high reliability can be achieved.

This embodiment can be implemented in appropriate combination with any of the other embodiments.

(Embodiment 3)

In this embodiment, a specific example of a voltage control circuit applicable to the light-emitting devices described in Embodiment 1 and Embodiment 2 is described.

Figure 7:
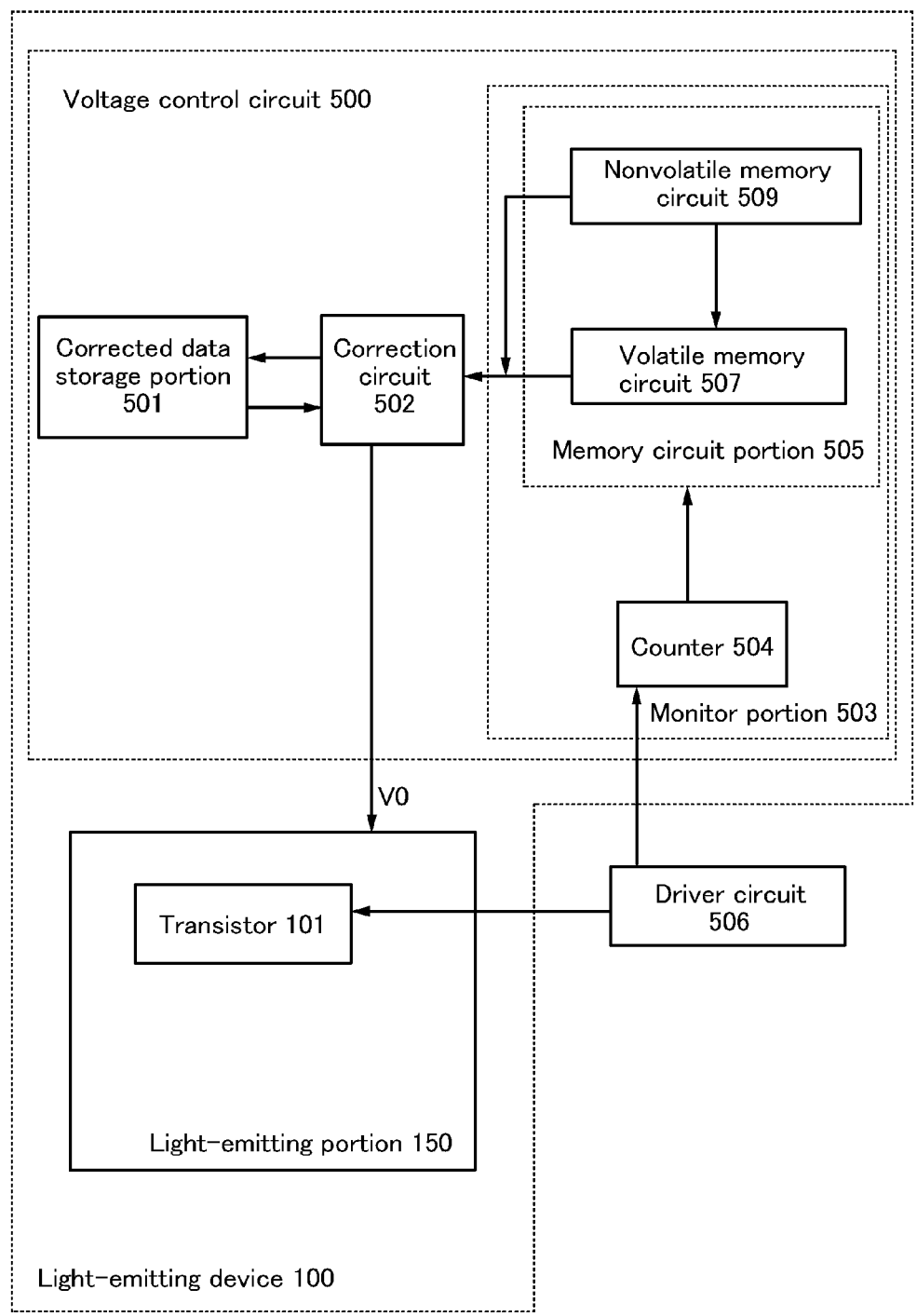
FIG. 7 illustrates a voltage control circuit applicable to a light-emitting device of one embodiment of the present invention.

FIG. 7 shows a block diagram of a voltage control circuit 500 which is an example of the voltage control circuit 117 described in Embodiment 1. The voltage control circuit 500 includes a corrected data storage portion 501, a correction circuit 502, and a monitor portion 503 which monitors a condition or the like to which a driving time, a degradation factor, or the like of a transistor included in a light-emitting device is input.

Here, though the voltage control circuit 500 is applied to the light-emitting device 100 described in Embodiment 1, the voltage control circuit 500 can also be applied to the light-emitting device 200. Note that here, structures other than the voltage control circuit 117 included in the light-emitting device 100 are described as a light-emitting portion 150.

In the corrected data storage portion 501, the amount of change in threshold voltage of the transistor 101 due to degradation over time is stored as information in advance. The data is used as an index when a voltage is corrected in accordance with the degree of degradation of the transistor, which is described later.

As the data stored in the corrected data storage portion, for example, data in which the amount of change in threshold voltage at the time when a positive BT stress test is performed on the transistor or the amount of change in threshold voltage at the time when a negative BT stress test is performed on the transistor is stored may be used.

The monitor portion 503, specifically, includes a counter 504 and a memory circuit portion 505.

The counter 504 regularly samples (e.g., every second) data on degradation factors of the transistor, such as voltage, temperature, and the amount of light irradiation, which is input to a transistor, and counts the sampled data. Here, data to be sampled may be one of the degradation factors, such as voltage applied to the transistor, temperature, and the amount of light irradiation; however, a plurality of pieces of data may be sampled and combined. A data object to be sampled may be set to the data to be stored in the corrected data storage portion.

In this embodiment, the degradation factors applied to the transistor are sampled from a driver circuit 506 of the light-emitting device and counted.

The counted data is sequentially stored in the memory circuit portion 505. The degradation factors are accumulated; thus, the memory circuit portion 505 is preferably formed using a nonvolatile memory circuit. However, the number of writing data to a nonvolatile memory is generally limited; therefore, the memory circuit portion 505 includes a volatile memory circuit 507 and a nonvolatile memory circuit 509. For example, data is stored in the volatile memory circuit 507 in operation of the transistor and the data stored in the volatile memory circuit 507 may be written to the nonvolatile memory circuit 509 at a certain interval.

Any type of memory circuit can be used as the volatile memory circuit 507 and the nonvolatile memory circuit 509. For example, as the volatile memory circuit 507, a register, an SRAM (static random access memory), a DRAM (dynamic random access memory), or the like may be used; as the nonvolatile memory circuit 509, a Flash EEPROM (flash memory) or the like may be used.

The correction circuit 502 outputs an appropriate potential input to the light-emitting portion 150 with reference to the data stored in the monitor portion 503 and the data stored in the corrected data storage portion 501.

Further, as the transistor included in the light-emitting device of one embodiment of the present invention, a transistor in which the threshold voltage changes only in a positive direction is used. Therefore, as the correction circuit 502, a circuit in which output voltage is gradually decreased in accordance with accumulation time for applying temperature, light, voltage, and the like to the transistor may be used When power supply is stopped, the data stored in the volatile memory circuit 507 is added to the data stored in the nonvolatile memory circuit 509 and stored. Accordingly, after power supply is restarted on next time, the degradation factors of the transistor can be continually measured.

As described above, the degradation factors applied to the transistor are regularly detected, the data of the accumulated degradation is stored, and the data of variation characteristics of the threshold voltage of the transistor, which is stored in advance, is referred to, whereby an appropriate potential for obtaining the threshold voltage of the light-emitting device in a short time can be output.

Figure 8A:
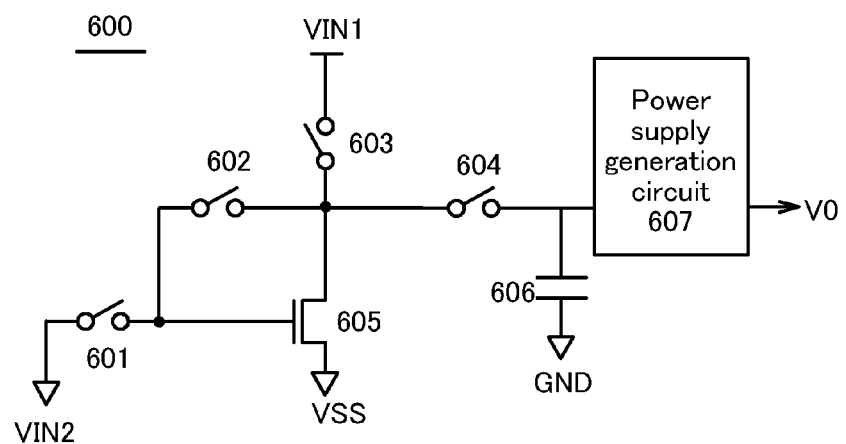
FIGS. 8A and 8B each illustrate a voltage control circuit applicable to a light-emitting device of one embodiment of the present invention.

Next, another embodiment of the voltage control circuit is described. A voltage control circuit 600 shown in FIG. 8A includes switches 601 to 604, a monitor transistor 605, and a capacitor 606.

A drain of the monitor transistor 605 is electrically connected to the switch 603 which controls input of a potential VIN1. A gate of the monitor transistor 605 is electrically connected to the switch 601 which controls input of a potential VIN2. The gate and the drain of the monitor transistor 605 are electrically connected to each other through the switch 602.

Note that the potential VIN1 and the potential VIN2 are variable potentials which can be set as appropriate in each operation.

A low-level potential VSS is applied to a source of the monitor transistor 605. Further, the capacitor 606 is electrically connected so as to hold a voltage between the gate and the source of the monitor transistor 605. Note that the switch 604 is electrically connected between the monitor transistor 605 and the capacitor 606.

Next, the operation of the voltage control circuit 600 is described.

First, in a normal operation of the light-emitting device, the monitor transistor 605 is driven so that the conditions of a gate voltage, temperature, the amount of light irradiation, and the like of the monitor transistor 605 are similar to those of a transistor which obtains threshold voltage in the light-emitting device (the transistor 101 in FIG. 1). Specifically, the switch 601 and the switch 603 are turned on and the switch 602 and the switch 604 are turned off, and voltage between the gate and the source and voltage between the source and the drain of the monitor transistor 605 are selected from VIN1 and VIN2 so that the conditions are similar to those of the transistor in the light-emitting device.

By the above operation, changes in the threshold voltage between the monitor transistor 605 and the transistor which obtains the threshold voltage can be the same.

Next, the operation for generating output voltage of the voltage control circuit 600 is described. Before the output voltage is generated, the voltage control circuit 600 obtains the threshold voltage of the monitor transistor 605. First, the operation for obtaining the threshold voltage of the monitor transistor 605 is described.

A first operation for obtaining the threshold voltage of the monitor transistor 605 is as follows: the switch 602 and the switch 603 are turned on and the switch 601 and the switch 604 are turned off, and the potential VIN1 and the potential VIN2 are each set to a high potential VDD, whereby the high potential VDD is input to each of the gate and the drain of the monitor transistor.

By the above operation, the gate voltage of the monitor transistor 605 becomes VDD−VSS, so that the monitor transistor 605 is turned on and the drain current flows.

Next, a second operation for obtaining the threshold voltage is described. In the second operation, the switch 602 is turned on and the switch 601, the switch 603, and the switch 604 are turned off.

With the above structure, the gate and the drain of the monitor transistor 605 becomes a floating state. Then, while the drain current flows, the potential of the gate of the monitor transistor 605 is decreased, and the gate voltage of the monitor transistor 605 is decreased to the threshold voltage Vthm of the monitor transistor 605, so that the monitor transistor 605 is turned off. As a result, the gate voltage of the monitor transistor 605 is equal to the threshold voltage Vthm of the monitor transistor 605.

Next, a third operation for obtaining the threshold voltage is described. In the third operation, the switch 602 and the switch 604 are turned on and the switch 601 and the switch 603 are turned off.

The switch 604 is turned on, whereby the gate voltage of the monitor transistor 605, that is, the threshold voltage of the monitor transistor 605, is input to the capacitor 606 and a power supply generation circuit 607. The voltage V0 input to the light-emitting portion 150 is set as appropriate based on the threshold voltage of the monitor transistor 605, which is input to the power supply generation circuit 607. Note that the method for setting a potential input to the light-emitting portion 150 is described in detail in Embodiment 1, and therefore the description is omitted here.

Further, even if the switch 604 is turned off, the threshold voltage of the monitor transistor 605 is stored in the capacitor 606; therefore, an appropriate potential can be generated.

Note that input of a potential to the monitor transistor 605 described in this embodiment can be controlled from the outside of the voltage control circuit 600 as well as from the inside thereof. Thus, the switch 601, the switch 602, and the switch 603 may be provided inside or outside the voltage control circuit 600.

Figure 8B:
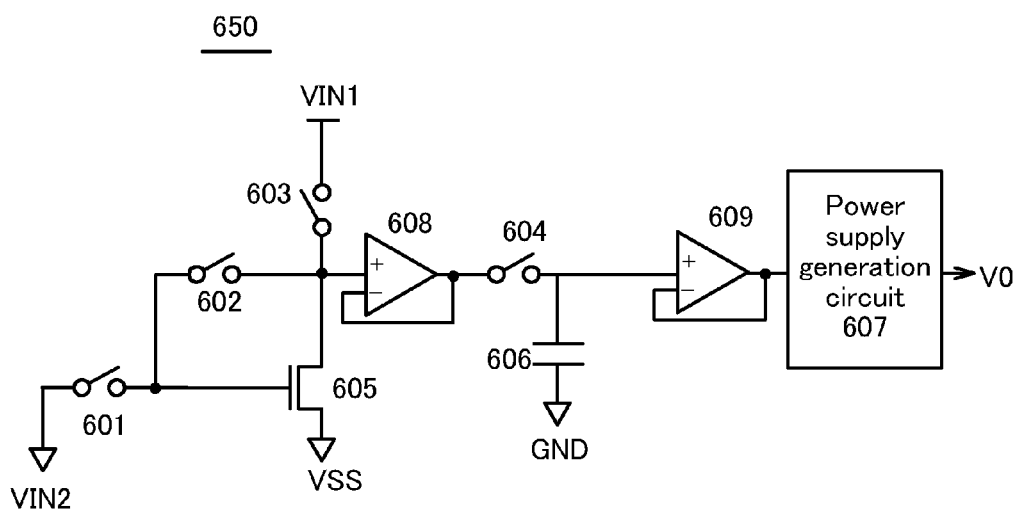

Further, in a voltage control circuit 650 described in this embodiment, an impedance converter may be provided between the monitor transistor 605 and the switch 604 and/or between the capacitor 606 and the power supply generation circuit 607. FIG. 8B shows an example in which voltage followers 608 and 609 are provided as the impedance converters between the monitor transistor 605 and the switch 604 and between the capacitor 606 and the power supply generation circuit 607.

By providing the voltage followers 608 and 609, a decrease in voltage due to a capacitor, a switch, or the like is suppressed and the threshold voltage of the monitor transistor 605 input to the power supply generation circuit 607 can be an accurate value.

Note that the voltage control circuit 317 described in Embodiment 2 can be manufactured by combining the voltage control circuits 500, 600, and 650 in this embodiment as appropriate.

This embodiment can be implemented in appropriate combination with the other embodiments.

(Embodiment 4)

In this embodiment, a semiconductor device including a transistor in which threshold voltage changes in a positive direction and the amount of change in the threshold voltage is small (e.g., lower than or equal to 2.5 V), and which is used for a light-emitting device of one embodiment of the present invention, and a manufacturing method thereof are described with reference to drawings.

Figure 9A:
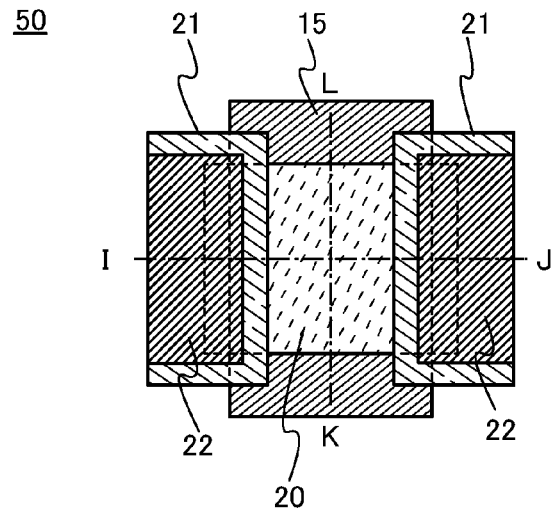
FIGS. 9A to 9D illustrate one embodiment of a transistor.
Figure 9C:
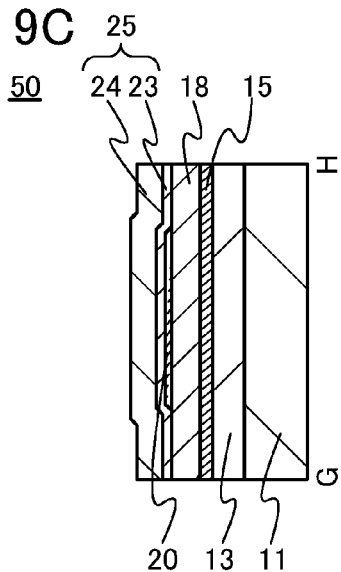
Figure 9B:
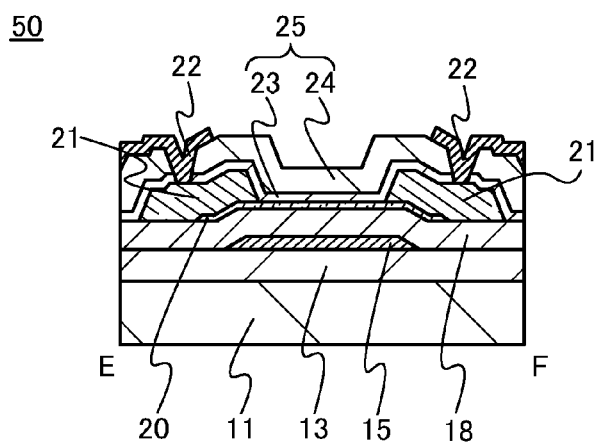

FIGS. 9A to 9C are a top view and cross-sectional views of a transistor 50 of a semiconductor device. FIG. 9A is a top view of the transistor 50, FIG. 9B is a cross-sectional view taken along dashed-dotted line I-J in FIG. 9A, and FIG. 9C is a cross-sectional view taken along dashed-dotted line K-L in FIG. 9A. Note that in FIG. 9A, some components of the transistor 50 (e.g., a substrate 11, a base insulating film 13, a gate insulating film 18, an insulating film 23, an insulating film 24, and the like) are omitted for simplicity.

The transistor 50 illustrated in FIGS. 9B and 9C includes the base insulating film 13 provided over the substrate 11 and a gate electrode 15 formed over the base insulating film 13. Moreover, the gate insulating film 18 is formed over the base insulating film 13 and the gate electrode 15, and an oxide semiconductor film 20 overlapping with the gate electrode 15 with the gate insulating film 18 provided therebetween, and a pair of electrodes 21 in contact with the oxide semiconductor film 20 are included. A protective film 25 including the insulating film 23 and the insulating film 24 is over the gate insulating film 18, the oxide semiconductor film 20, and the pair of electrodes 21. The pair of electrodes 21 is connected to the wiring 22 through an opening provided in the protective film 25.

Further, the insulating film 23 is formed to be in contact with the oxide semiconductor film 20 in the transistor 50 described in this embodiment. The insulating film 23 is an oxide insulating film into which and from which oxygen is diffused. Note that here, diffusion of oxygen includes movement of oxygen in the insulating film 23 as well as movement of oxygen to the oxide semiconductor film 20 through the insulating film 23.

When an oxide insulating film into which and from which oxygen is diffused is formed as the insulating film 23, oxygen released from the oxide insulating film which contains oxygen at a higher proportion than the stoichiometric composition and is provided over the insulating film 23 can be diffused into the oxide semiconductor film 20 through the insulating film 23.

As the insulating film 23, a silicon oxide film, a silicon oxynitride film, or the like having a thickness greater than or equal to 5 nm and less than or equal to 150 nm, preferably greater than or equal to 5 nm and less than or equal to 50 nm, more preferably greater than or equal to 10 nm and less than or equal to 30 nm can be used.

Further, the insulating film 24 is formed to be in contact with the insulating film 23. The insulating film 24 is an oxide insulating film which contains oxygen at a higher proportion than the stoichiometric composition.

As the insulating film 24, a silicon oxide film, a silicon oxynitride film, or the like having a thickness greater than or equal to 30 nm and less than or equal to 500 nm, preferably greater than or equal to 150 nm and less than or equal to 400 nm can be used.

Part of oxygen is released by heating from the oxide insulating film which contains oxygen at a higher proportion than the stoichiometric composition. Therefore, when the oxide insulating film from which part of oxygen is released by heating is provided over the insulating film 23 as the insulating film 24, oxygen can be diffused into the oxide semiconductor film 20 and oxygen vacancies in the oxide semiconductor film 20 can be compensated. Alternatively, when the insulating film 24 is formed over the insulating film 23 during heating, oxygen can be diffused into the oxide semiconductor film 20 and oxygen vacancies in the oxide semiconductor film 20 can be compensated. Still alternatively, when the insulating film 24 is formed over the insulating film 23 and is then subjected to heat treatment, oxygen can be diffused into the oxide semiconductor film 20 and oxygen vacancies in the oxide semiconductor film 20 can be compensated. Consequently, the amount of oxygen vacancies in the oxide semiconductor film can be reduced.

When the oxide insulating film which contains oxygen at a higher proportion than the stoichiometric composition is provided over a back channel of the oxide semiconductor film 20 (a surface of the oxide semiconductor film 20, which is opposite to a surface facing the gate electrode 15) through the oxide insulating film into which and from which oxygen is diffused, oxygen can be diffused on the back channel side of the oxide semiconductor film 20, and oxygen vacancies on the back channel side can be reduced. The transistor 50 having such a structure has the following electrical characteristics: the threshold voltage changes in a positive direction due to a BT stress test and a BT photostress test, and the amount of change ($\Delta$Vth) is less than or equal to 2.5 V, preferably less than or equal to 1.5 V.

Note that in the process for forming the insulating film 24, in the case where the oxide semiconductor film 20 is not damaged, the insulating film 23 is not provided and only the insulating film 24 which is an oxide insulating film from which part of oxygen is released by heating may be provided as a protective film.

Further, it is possible to prevent outward diffusion of oxygen from the oxide semiconductor film 20 and entry of hydrogen, water, or the like into the oxide semiconductor film 20 from the outside by providing an insulating film having a blocking effect against oxygen, hydrogen, water, and the like over the insulating film 24. As for the insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, and a hafnium oxynitride film can be given as examples.

Here, electrical characteristics of a transistor having a small amount of change in threshold voltage in a BT stress test and a BT photostress test are described with reference to FIG. 9D.

The stress conditions for the BT stress test can be determined by setting the substrate temperature, the electric field intensity applied to the gate insulating film, and the time period of application of an electric field. The intensity of the electric field applied to the gate insulating film is determined in accordance with a value obtained by dividing a potential difference between the gate, and the source and the drain by the thickness of the gate insulating film. For example, in the case where the intensity of the electric field applied to the 100-nm-thick gate insulating film is to be 3 MV/cm, the potential difference between the gate, and the source and the drain can be set to 30 V.

Figure 9D:
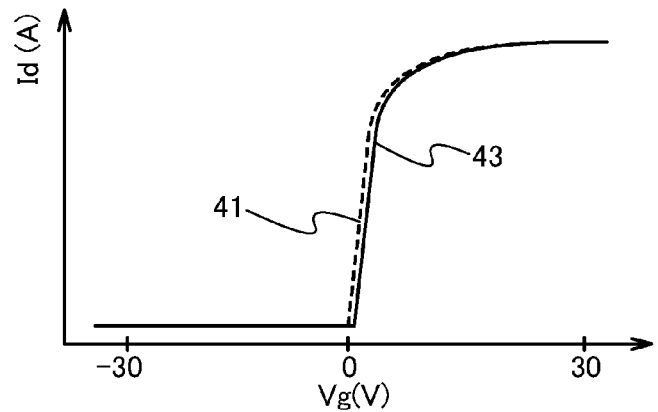

FIG. 9D shows electrical characteristics of the transistor, and the horizontal axis indicates the gate voltage and the vertical axis indicates the drain current (a logarithm scale). A dashed line 41 denotes the initial characteristics of the transistor, and a solid line 43 denotes the electrical characteristics of the transistor after the BT stress test. The transistor of this embodiment has the following electrical characteristics: the amount of change in the threshold voltage in the dashed line 41 and the solid line 43 is 0 V or the threshold voltage changes in a positive direction, and the amount of change is less than or equal to 2.5 V, preferably less than or equal to 1.5 V, more preferably much less. Therefore, in the transistor of this embodiment, the threshold voltage is not shifted in the negative direction in the electrical characteristics after the BT stress test. That is, a transistor having normally-off characteristics does not become a transistor having normally-on characteristics by long-term usage. As a result, it is apparent that the transistor 50 of this embodiment has high reliability.

Note that a transistor including an oxide semiconductor film is an n-channel transistor; therefore, in this specification, a transistor which can be regarded as having no drain current flowing therein when a gate voltage is 0 V is defined as a transistor having normally-off characteristics. In contrast, a transistor which can be regarded as having a drain current flowing therein when a gate voltage is 0 V is defined as a transistor having normally-on characteristics.

Other details of the transistor 50 are described below.

There is no particular limitation on the property of a material and the like of the substrate 11 as long as the material has heat resistance enough to withstand at least later heat treatment. For example, a glass substrate, a ceramic substrate, a quartz substrate, a sapphire substrate, or the like may be used as the substrate 11. Alternatively, a single crystal semiconductor substrate or a polycrystalline semiconductor substrate made of silicon, silicon carbide, or the like, a compound semiconductor substrate made of silicon germanium or the like, an SOI substrate, or the like may be used as the substrate 11. Furthermore, any of these substrates further provided with a semiconductor element may be used as the substrate 11.

Still alternatively, a flexible substrate may be used as the substrate 11, and the base insulating film 13 and the transistor 50 may be provided directly on the flexible substrate. Alternatively, a separation layer may be provided between the substrate 11 and the base insulating film 13. The separation layer can be used when part or the whole of a semiconductor device formed over the separation layer is separated from the substrate 11 and transferred onto another substrate. In such a case, the transistor 50 can be transferred to a substrate having low heat resistance or a flexible substrate as well.

As the base insulating film 13, a silicon oxide film, a silicon oxynitride film, a silicon nitride film, a silicon nitride oxide film, a gallium oxide film, a hafnium oxide film, an yttrium oxide film, an aluminum oxide film, an aluminum oxynitride film, and the like can be given as examples. Note that when a silicon nitride film, a gallium oxide film, a hafnium oxide film, an yttrium oxide film, an aluminum oxide film, or the like is used as the base insulating film 13, it is possible to suppress diffusion of impurities such as an alkali metal, water, and hydrogen into the oxide semiconductor film 20 from the substrate 11. Note that in this specification, a "silicon oxynitride film" refers to a film that includes more oxygen than nitrogen, and a "silicon nitride oxide film" refers to a film that includes more nitrogen than oxygen.

The gate electrode 15 can be formed using a metal element selected from aluminum, chromium, copper, tantalum, titanium, molybdenum, and tungsten; an alloy containing any of these metal elements as a component; an alloy containing these metal elements in combination; or the like. Further, one or more metal elements selected from manganese and zirconium may be used. Further, the gate electrode 15 may have a single-layer structure or a stacked-layer structure of two or more layers. A single-layer structure of an aluminum film containing silicon; a two-layer structure in which a titanium film is stacked over an aluminum film; a two-layer structure in which a titanium film is stacked over a titanium nitride film; a two-layer structure in which a tungsten film is stacked over a titanium nitride film; a two-layer structure in which a tungsten film is stacked over a tantalum nitride film or a tungsten nitride film; and a three-layer structure in which a titanium film, an aluminum film, and a titanium film are stacked in this order can be given as examples. Alternatively, a film, an alloy film, or a nitride film which contains aluminum and one or more elements selected from titanium, tantalum, tungsten, molybdenum, chromium, neodymium, and scandium may be used.

Further, the gate electrode 15 can be formed using a light-transmitting conductive material such as an In—Sn oxide (also referred to as ITO), an In—W oxide, an In—W—Zn oxide, an In—Ti oxide, an In—Sn—Ti oxide, an In—Zn oxide, and an In—Sn—Si oxide. It is also possible to have a stacked-layer structure formed using the above light-transmitting conductive material and the above metal element.

Further, an In—Ga—Zn-based oxynitride semiconductor film, an In—Sn-based oxynitride semiconductor film, an In—Ga-based oxynitride semiconductor film, an In—Zn-based oxynitride semiconductor film, a Sn-based oxynitride semiconductor film, an In-based oxynitride semiconductor film, a film of a metal nitride (such as InN or ZnN), or the like may be provided between the gate electrode 15 and the gate insulating film 18. These films each have a work function higher than or equal to 5 eV, preferably higher than or equal to 5.5 eV, which is higher than the electron affinity of an oxide semiconductor; thus, the threshold voltage of a transistor including the oxide semiconductor can be shifted in the positive direction. Accordingly, a switching element having what is called normally-off characteristics can be obtained. For example, in the case of using an In—Ga—Zn-based oxynitride semiconductor film, an In—Ga—Zn-based oxynitride semiconductor film having a higher nitrogen concentration than at least the oxide semiconductor film 20, specifically, an In—Ga—Zn-based oxynitride semiconductor film having a nitrogen concentration higher than or equal to 7 at. % is used.

The gate insulating film 18 can be formed to have a single-layer structure or a stacked-layer structure using, for example, one or more of a silicon oxide film, a silicon oxynitride film, a silicon nitride oxide film, a silicon nitride film, an aluminum oxide film, a hafnium oxide film, a gallium oxide film, and a Ga—Zn-based oxide film. The gate insulating film 18 may be formed using an oxide insulator from which oxygen is released by heating. With the use of a film from which oxygen is released by heating as the gate insulating film 18, interface states at the interface between the oxide semiconductor film 20 and the gate insulating film 18 can be reduced; accordingly, a transistor with less deterioration in electrical characteristics can be obtained. Further, it is possible to prevent outward diffusion of oxygen from the oxide semiconductor film 20 and entry of hydrogen, water, or the like into the oxide semiconductor film 20 from the outside by providing an insulating film having a blocking effect against oxygen, hydrogen, water, and the like under the gate insulating film 18. As for the insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, and a hafnium oxynitride film can be given as examples.

The gate insulating film 18 may be formed using a high-k material such as hafnium silicate ($HfSiO_x$), hafnium silicate to which nitrogen is added ($HfSi_xO_yN_z$), hafnium aluminate to which nitrogen is added ($HfAl_xO_yN_z$), hafnium oxide, or yttrium oxide, so that gate leakage current of the transistor can be reduced.

The thickness of the gate insulating film 18 is preferably greater than or equal to 5 nm and less than or equal to 400 nm, more preferably greater than or equal to 10 nm and less than or equal to 300 nm, still more preferably greater than or equal to 50 nm and less than or equal to 250 nm.

The oxide semiconductor film 20 preferably contains at least indium (In) or zinc (Zn). Alternatively, the oxide semiconductor film 20 preferably contains In and Zn. In order to reduce variation in electrical characteristics of the transistors including the oxide semiconductor film, the oxide semiconductor preferably contains one or more of stabilizers in addition to In or Zn.

As for stabilizers, gallium (Ga), tin (Sn), hafnium (Hf), aluminum (Al), zirconium (Zr), and the like can be given as examples. As another stabilizer, lanthanoids such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) can be given as examples.

As the oxide semiconductor, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide, an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Note that, for example, an In—Ga—Zn-based oxide means an oxide containing In, Ga, and Zn as its main components and there is no particular limitation on the ratio of In, Ga, and Zn. The In—Ga—Zn-based metal oxide may contain a metal element other than In, Ga, and Zn.

Alternatively, a material represented by $InMO_3(ZnO)_m$ ($m>0$ is satisfied, and m is not an integer) may be used as the oxide semiconductor. Note that M represents one or more metal elements selected from Ga, Fe, Mn, and Co. Alternatively, as the oxide semiconductor, a material represented by $In_2SnO_5(ZnO)_n$ ($n>0$ is satisfied, n is an integer) may be used.

For example, it is possible to use an In—Ga—Zn-based oxide containing In, Ga, and Zn at an atomic ratio of 1:1:1, 2:2:1, or 3:1:2, or any of oxides whose composition is in the neighborhood of the above compositions. Alternatively, an In—Sn—Zn-based oxide containing In, Sn, and Zn at an atomic ratio of 1:1:1, 2:1:3, or 2:1:5, or any of oxides whose composition is in the neighborhood of the above compositions may be used.

However, the composition is not limited to those described above, and a material having the appropriate composition may be used depending on needed semiconductor characteristics and electrical characteristics (e.g., field-effect mobility, threshold voltage, and variation). In order to obtain needed semiconductor characteristics, it is preferred that the carrier density, the impurity concentration, the defect density, the atomic ratio of a metal element and oxygen, the interatomic distance, the density, and the like be set to be appropriate.

For example, high electron mobility can be obtained relatively easily in the case where the In—Sn—Zn-based oxide is used. However, the electron mobility can be increased by reducing the defect density in the bulk also in the case where the In—Ga—Zn-based oxide is used.

Further, the energy gap of a metal oxide that can form the oxide semiconductor film 20 is greater than or equal to 2 eV, preferably greater than or equal to 2.5 eV, more preferably greater than or equal to 3 eV. In this manner, the off-state current of a transistor can be reduced by using an oxide semiconductor having a wide energy gap.

A structure of an oxide semiconductor film which can be used as the oxide semiconductor film 20 is described below.

An oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example thereof is an oxide semiconductor film in which no crystal part exists even in a microscopic region, and the whole of the film is amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit inside a cube whose one side is less than 100 nm. Thus, there is a case where a crystal part included in the CAAC-OS film fits a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film. In this specification, a term "parallel" indicates that the angle formed between two straight lines is greater than or equal to −10° and less than or equal to 10°, and accordingly also includes the case where the angle is greater than or equal to −5° and less than or equal to 5°. In addition, a term "perpendicular" indicates that the angle formed between two straight lines is greater than or equal to 80° and less than or equal to 100°, and accordingly includes the case where the angle is greater than or equal to 85° and less than or equal to 95°.

On the other hand, according to the TEM image of the CAAC-OS film observed in a direction substantially perpendicular to the sample surface (plan TEM image), metal atoms are arranged in a triangular or hexagonal configuration in the crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film. In this specification, the trigonal and rhombohedral crystal systems are included in the hexagonal crystal system.

On the other hand, when the CAAC-OS film is analyzed by an in-plane method in which an X-ray enters a sample in a direction perpendicular to the c-axis, a peak appears frequently when 2θ is around 56°. This peak is derived from the (110) plane of the $InGaZnO_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

In a transistor using the CAAC-OS film, change in electrical characteristics due to irradiation with visible light or ultraviolet light is small. Thus, the transistor has high reliability.

Note that an oxide semiconductor film may be a stacked film including two or more films of an amorphous oxide semiconductor film, a microcrystalline oxide semiconductor film, and a CAAC-OS film, for example.

Alternatively, the oxide semiconductor film 20 may have a stacked-layer structure of a plurality of oxide semiconductor films. For example, the oxide semiconductor film 20 may have a stacked-layer structure of a first oxide semiconductor film and a second oxide semiconductor film which are formed using metal oxides with different compositions.

Further, the constituent elements of the first oxide semiconductor film and the second oxide semiconductor film may be made the same and the composition of the constituent elements of the first oxide semiconductor film and the second oxide semiconductor film may be made different. For example, the first oxide semiconductor film may contain In, Ga, and Zn at an atomic ratio of 1:1:1, and the second oxide semiconductor film may contain In, Ga, and Zn at an atomic ratio of 3:1:2. Alternatively, the first oxide semiconductor film may contain In, Ga, and Zn at an atomic ratio of 1:3:2, and the second oxide semiconductor film may contain In, Ga, and Zn at an atomic ratio of 2:1:3.

At this time, one of the first oxide semiconductor film and the second oxide semiconductor film, which is closer to the gate electrode (on the channel side), preferably contains In and Ga at a proportion of In>Ga. The other oxide semiconductor film, which is farther from the gate electrode (on the back channel side) preferably contains In and Ga at a proportion of In≤Ga.

Further, the oxide semiconductor film 20 may have a three-layer structure of a first oxide semiconductor film, a second oxide semiconductor film, and a third oxide semiconductor film, in which the constituent elements thereof is made the same and the composition of the constituent elements of the first oxide semiconductor film, the second oxide semiconductor film, and the third oxide semiconductor film is made different. For example, the first oxide semiconductor film may contain In, Ga, and Zn at an atomic ratio of 1:3:2, the second oxide semiconductor film may contain In, Ga, and Zn at an atomic ratio of 3:1:2, and the third oxide semiconductor film may contain In, Ga, and Zn at an atomic ratio of 1:1:1.

An oxide semiconductor film which contains less In than Ga and Zn at an atomic ratio, typically, the first oxide semiconductor film containing In, Ga, and Zn at an atomic ratio of 1:3:2, has a higher insulating property than an oxide semiconductor film containing more In than Ga and Zn at an atomic ratio, typically, the second oxide semiconductor film, and an oxide semiconductor film containing Ga, Zn, and In at the same atomic ratio, typically, the third oxide semiconductor film. Further, when the first oxide semiconductor film containing In, Ga, and Zn at an atomic ratio of 1:3:2 has an amorphous structure, the insulating property is further improved. Accordingly, the second oxide semiconductor film and the third oxide semiconductor film each serve as a channel region, and the first oxide semiconductor film serves as a gate insulating film.

Since the constituent elements of the first oxide semiconductor film, the second oxide semiconductor film, and the third oxide semiconductor film are the same, the first oxide semiconductor film has fewer trap levels at the interface with the second oxide semiconductor film. Therefore, when the oxide semiconductor film 20 has the above structure, the amount of change in the threshold voltage of the transistor due to a change over time or a BT photostress test can be reduced.

In an oxide semiconductor, the s orbital of heavy metal mainly contributes to carrier transfer, and when the In content in the oxide semiconductor is increased, overlap of the s orbitals is likely to be increased. Therefore, an oxide containing In and Ga at a proportion of In>Ga has higher electron mobility than an oxide containing In and Ga at a proportion of In≤Ga. Further, in Ga, the formation energy of an oxygen vacancy is larger and thus an oxygen vacancy is less likely to occur, than in In; therefore, the oxide containing In and Ga at a proportion of In≤Ga has more stable characteristics than the oxide containing In and Ga at a proportion of In>Ga.

An oxide semiconductor containing In and Ga at a proportion of In>Ga is used on the channel side, and an oxide semiconductor containing In and Ga at a proportion of In≤Ga is used on the back channel side; so that field-effect mobility and reliability of the transistor can be further improved.

Further, the first oxide semiconductor film, the second oxide semiconductor film, and the third oxide semiconductor film may be formed using oxide semiconductors having different crystallinity. That is, the oxide semiconductor film 20 may be formed using any of a single crystal oxide semiconductor, a polycrystalline oxide semiconductor, an amorphous oxide semiconductor, and a CAAC-OS, as appropriate. When an amorphous oxide semiconductor is applied to any of the first oxide semiconductor film and the second oxide semiconductor film, internal stress or external stress of the oxide semiconductor film 20 is relieved, change in characteristics of the transistor is reduced, and reliability of the transistor can be further improved.

The thickness of the oxide semiconductor film 20 is preferably greater than or equal to 1 nm and less than or equal to 100 nm, more preferably greater than or equal to 1 nm and less than or equal to 50 nm, still more preferably greater than or equal to 1 nm and less than or equal to 30 nm, further preferably greater than or equal to 3 nm and less than or equal to 20 nm.

The concentration of an alkali metal or an alkaline earth metal in the oxide semiconductor film 20, which is obtained by secondary ion mass spectrometry (SIMS), is preferably lower than or equal to $1 \times 10^{18}$ atoms/cm$^3$, more preferably lower than or equal to $2 \times 10^{16}$ atoms/cm$^3$. This is because, when an alkali metal or an alkaline earth metal is bonded to an oxide semiconductor, carriers are generated in some cases, which cause an increase in the off-state current of the transistor.

The hydrogen concentration in the oxide semiconductor film 20, which is obtained by secondary ion mass spectrometry, is lower than $5 \times 10^{18}$ atoms/cm$^3$, preferably lower than or equal to $1 \times 10^{18}$ atoms/cm$^3$, more preferably lower than or equal to $5 \times 10^{17}$ atoms/cm$^3$, still more preferably lower than or equal to $1 \times 10^{16}$ atoms/cm$^3$.

Hydrogen contained in the oxide semiconductor film 20 reacts with oxygen bonded to a metal atom to produce water, and a defect is formed in a lattice from which oxygen is released (or a portion from which oxygen is removed). In addition, a bond of a part of hydrogen and oxygen causes generation of electrons serving as carriers. Thus, the impurities containing hydrogen are reduced as much as possible in the formation process of the oxide semiconductor film, whereby the concentration of hydrogen in the oxide semiconductor film can be reduced. Therefore, when a channel region is formed in an oxide semiconductor film that is highly purified by removing hydrogen as much as possible, the change in the threshold voltage in the negative direction can be reduced and leakage current between a source and a drain of a transistor, (typically, the off-state current or the like) can be reduced to several yoctoamperes per micrometer to several zeptoamperes per micrometer; thus, electrical characteristics of the transistor can be improved.

The oxide semiconductor film 20 may contain nitrogen at a concentration lower than or equal to $5 \times 10^{18}$ atoms/cm$^3$.

The pair of electrodes 21 is formed to have a single-layer structure or a stacked-layer structure including any of metals such as aluminum, titanium, chromium, nickel, copper, yttrium, zirconium, molybdenum, silver, tantalum, and tungsten or an alloy containing any of these metals as its main component. A single-layer structure of an aluminum film containing silicon; a two-layer structure in which a titanium film is stacked over an aluminum film; a two-layer structure in which a titanium film is stacked over a tungsten film; a two-layer structure in which a copper film is formed over a copper-magnesium-aluminum alloy film; a three-layer structure in which a titanium film or a titanium nitride film, an aluminum film or a copper film, and a titanium film or a titanium nitride film are stacked in this order; and a three-layer structure in which a molybdenum film or a molybdenum nitride film, an aluminum film or a copper film, and a molybdenum film or a molybdenum nitride film are stacked in this order can be given as examples. Note that a transparent conductive material containing indium oxide, tin oxide, or zinc oxide may be used.

Next, a method for manufacturing the transistor 50 illustrated in FIGS. 9A to 9D is described with reference to FIGS. 10A to 10D.

Figure 10A:
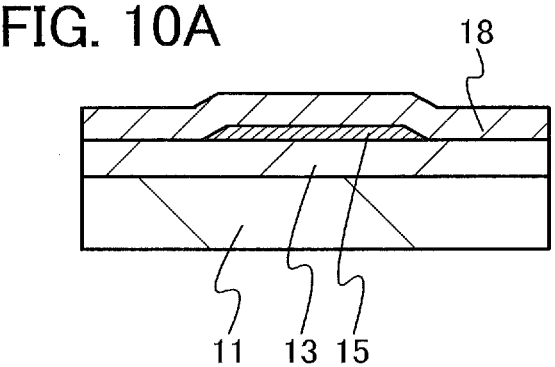
FIGS. 10A to 10D illustrate one embodiment of a method for manufacturing a transistor.

As illustrated in FIG. 10A, the base insulating film 13 and the gate electrode 15 are formed over the substrate 11, and the gate insulating film 18 is formed over the gate electrode 15.

The base insulating film 13 is formed by a sputtering method, a CVD method or the like. Here, a 100-nm-thick silicon oxynitride film is formed by a CVD method.

A formation method of the gate electrode 15 is described below. First, a conductive film is formed by a sputtering method, a CVD method, an evaporation method, or the like and then a mask is formed over the conductive film by a photolithography process. Then, part of the conductive film is etched using the mask to form the gate electrode 15. After that, the mask is removed.

Note that instead of the above formation method, the gate electrode 15 may be formed by an electrolytic plating method, a printing method, an ink-jet method, or the like.

Here, a 100-nm-thick tungsten film is formed by a sputtering method. Then, a mask is formed by a photolithography process and the tungsten film is dry-etched using the mask to form the gate electrode 15.

The gate insulating film 18 is formed by a sputtering method, a CVD method, an evaporation method, or the like.

In the case where the gate insulating film 18 is formed using a silicon oxide film, a silicon oxynitride film, or a silicon nitride oxide film, a deposition gas containing silicon and an oxidizing gas are preferred to be used as a source gas. As typical examples of the deposition gas containing silicon, silane, disilane, and trisilane can be cited. As the oxidizing gas, oxygen, ozone, dinitrogen monoxide, nitrogen dioxide, dry air, and the like can be given as examples.

In the case where a silicon nitride film is formed as the gate insulating film 18, it is preferred to use a two-step formation method. First, a first silicon nitride film with few defects is formed by a plasma CVD method in which a mixed gas of silane, nitrogen, and ammonia is used as a source gas. Then, a second silicon nitride film in which the hydrogen concentration is low and hydrogen can be blocked is formed by switching the source gas to a mixed gas of silane and nitrogen. With such a formation method, a silicon nitride film having few defects and a blocking property against hydrogen can be formed as the gate insulating film 18.

Moreover, in the case where a gallium oxide film is formed as the gate insulating film 18, a metal organic chemical vapor deposition (MOCVD) method can be used.

Figure 10B:
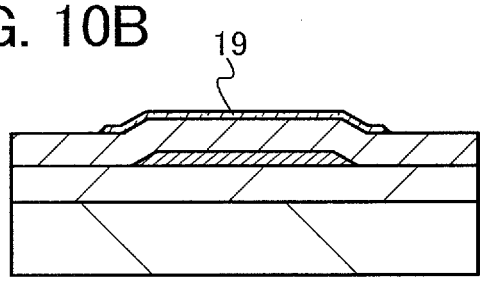

Next, as illustrated in FIG. 10B, an oxide semiconductor film 19 is formed over the gate insulating film 18.

A formation method of the oxide semiconductor film 19 is described below. An oxide semiconductor film is formed over the gate insulating film 18 by a sputtering method, a coating method, a pulsed laser deposition method, a laser ablation method, or the like. Then, after a mask is formed over the oxide semiconductor film by a photolithography process, the oxide semiconductor film is partly etched using the mask. Accordingly, the oxide semiconductor film 19 which is over the gate insulating film 18 and subjected to element isolation so as to partly overlap with the gate electrode 15 is formed as illustrated in FIG. 10B. After that, the mask is removed.

Alternatively, by using a printing method for forming the oxide semiconductor film 19, the oxide semiconductor film 19 subjected to element isolation can be formed directly.

As a power supply device for generating plasma in the case where the oxide semiconductor film is formed by a sputtering method, an RF power supply device, an AC power supply device, a DC power supply device, or the like can be used as appropriate.

As a sputtering gas, an atmosphere of a rare gas (typically argon), an oxygen gas, or a mixed gas of a rare gas and oxygen is used as appropriate. In the case where the mixed atmosphere of a rare gas and oxygen is used, the proportion of oxygen is preferred to be higher than that of a rare gas.

Note that the target may be selected as appropriate depending on the composition of the oxide semiconductor film to be formed.

A CAAC-OS film is formed by, for example, a sputtering method using a polycrystalline oxide semiconductor sputtering target. When ions collide with the sputtering target, a crystal region included in the sputtering target might be separated from the target along an a-b plane; in other words, a sputtered particle having a plane parallel to an a-b plane (flat-plate-like sputtered particle or pellet-like sputtered particle) might be separated from the sputtering target. In that case, the flat-plate-like sputtered particle reaches a substrate while maintaining their crystal state, whereby a crystal state of the sputtering target is transferred to the substrate and the CAAC-OS film can be deposited.

For the deposition of the CAAC-OS film, the following conditions are preferred to be used.

By reducing the concentration of impurities during the deposition, the crystal state can be prevented from being broken by the impurities. For example, reducing impurities (e.g., hydrogen, water, carbon dioxide, and nitrogen) which exist in the deposition chamber is favorable. Furthermore, impurities in a deposition gas can be reduced. Specifically, a deposition gas whose dew point is lower than or equal to $-80°$ C., preferably lower than or equal to $-100°$ C., can be used.

By increasing the substrate heating temperature during the deposition, migration of a sputtered particle is likely to occur after the sputtered particle is attached to a substrate surface. Specifically, the substrate heating temperature during the deposition is higher than or equal to $100°$ C. and lower than or equal to $740°$ C., preferably higher than or equal to $200°$ C. and lower than or equal to $500°$ C. By increasing the substrate heating temperature during the deposition, when the flat-plate-like sputtered particle reaches the substrate, migration occurs on the substrate surface, so that a flat plane of the flat-plate-like sputtered particle is attached to the substrate.

Furthermore, it is preferred that the proportion of oxygen in the deposition gas be increased and the power be optimized in order to reduce plasma damage at the deposition. The proportion of oxygen in the deposition gas is higher than or equal to 30 vol %, preferably 100 vol %.

As an example of the sputtering target, an In—Ga—Zn-based oxide target is described below.

The In—Ga—Zn-based oxide target, which is polycrystalline, is made by mixing $InO_X$ powder, $GaO_Y$ powder, and $ZnO_Z$ powder in a predetermined ratio, applying pressure, and performing heat treatment at a temperature higher than or equal to $1000°$ C. and lower than or equal to $1500°$ C. Note that X, Y, and Z are each a given positive number. Here, the predetermined ratio of $InO_X$ powder to $GaO_Y$ powder and $ZnO_Z$ powder is, for example, a molar ratio of 2:2:1, 8:4:3, 3:1:1, 1:1:1, 4:2:3, or 3:1:2. The kinds of powder and the ratio for mixing powder may be determined as appropriate depending on the desired sputtering target.

After the oxide semiconductor film is formed, dehydrogenation or dehydration may be performed by the heat treatment. The temperature of the heat treatment is typically higher than or equal to $150°$ C. and lower than the strain point of the substrate, preferably higher than or equal to $250°$ C. and lower than or equal to $450°$ C., more preferably higher than or equal to $300°$ C. and lower than or equal to $450°$ C.

The heat treatment is performed under atmosphere of an inert gas including nitrogen or a rare gas such as helium, neon, argon, xenon, or krypton. Alternatively, the heat treatment may be performed under an atmosphere of an inert gas first, and then under an oxygen atmosphere. It is preferred that the above atmosphere of an inert gas and oxygen atmosphere do not contain hydrogen, water, and the like. The treatment time is 3 minutes to 24 hours.

The heat treatment is performed after the oxide semiconductor film is formed, whereby the hydrogen concentration can be lower than $5\times10^{18}$ atoms/cm$^3$, preferably lower than or equal to $1\times10^{18}$ atoms/cm$^3$, more preferably lower than or equal to $5\times10^{17}$ atoms/cm$^3$, still more preferably lower than or equal to $1\times10^{16}$ atoms/cm$^3$.

Here, a 35-nm-thick oxide semiconductor film is formed by a sputtering method, a mask is formed over the oxide semiconductor film, and then part of the oxide semiconductor film is selectively etched. Accordingly, the oxide semiconductor film 19 is formed.

Figure 10C:
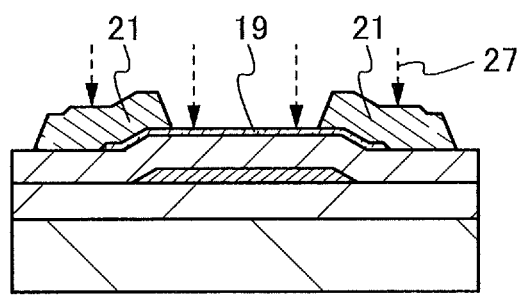

Next, as illustrated in FIG. 10C, the pair of electrodes 21 is formed.

A formation method of the pair of electrodes 21 is described below. First, a conductive film is formed by a sputtering method, a CVD method, an evaporation method, or the like. Then, a mask is formed over the conductive film by a photolithography process. After that, the conductive film is etched using the mask to form the pair of electrodes 21. Then, the mask is removed.

Here, a 50-nm-thick tungsten film, a 400-nm-thick aluminum film, and a 100-nm-thick titanium film are sequentially stacked by a sputtering method. Then, a mask is formed over the titanium film by a photolithography process and the tungsten film, the aluminum film, and the titanium film are dry-etched using the mask to form the pair of electrodes 21.

After the pair of electrodes 21 is formed, cleaning treatment is preferred to be performed to remove an etching residue. A short circuit of the pair of electrodes 21 can be suppressed by this cleaning treatment. The cleaning treatment can be performed using an alkaline solution such as a tetramethylammonium hydroxide (TMAH) solution; an acidic solution such as a diluted hydrofluoric acid solution, or an oxalic acid solution; or water.

Figure 10D:
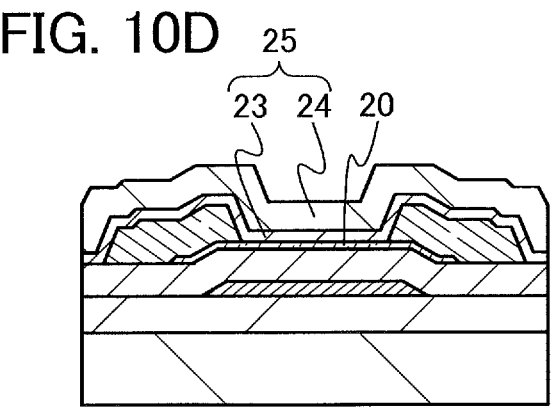

Next, the oxide semiconductor film 20 illustrated in FIG. 10D may be formed in such a manner that the oxide semiconductor film 19 is exposed to plasma generated in an oxygen atmosphere to be supplied with oxygen 27 as illustrated in FIG. 10C. As an oxidizing atmosphere, atmospheres of oxygen, ozone, dinitrogen monoxide, nitrogen dioxide, dry air, and the like can be given as examples. Further, in the plasma treatment, the oxide semiconductor film 19 is preferred to be exposed to plasma generated with no bias applied to the substrate 11 side. Consequently, the oxide semiconductor film 19 can be supplied with oxygen without being damaged; accordingly, the amount of oxygen vacancies in the oxide semiconductor film 20 can be reduced.

Here, the oxide semiconductor film 20 is formed by exposing the oxide semiconductor film 19 to oxygen plasma which is generated in such a manner that dinitrogen monoxide is introduced into a reaction chamber of a plasma CVD apparatus, and an upper electrode provided in the reaction chamber is supplied with high-frequency power of 150 W with the use of a 27.12 MHz high-frequency power source.

The surface of the oxide semiconductor film 19 is exposed to plasma generated in an oxygen atmosphere to be able to be supply oxygen to the oxide semiconductor film 19, whereby the amount of oxygen vacancies in the oxide semiconductor film can be reduced. Moreover, impurities remaining on the surface of the oxide semiconductor film 19 due to the etching treatment, for example, a halogen such as fluorine or chlorine, can be removed.

Next, the insulating film 23 is formed over the oxide semiconductor film 20 and the pair of electrodes 21. Then, the insulating film 24 is formed over the insulating film 23. At this time, the insulating film 23 is formed without exposure to the atmosphere after the oxide semiconductor film 20 is formed by the above plasma treatment, whereby the concentration of impurities at the interface between the oxide semiconductor film 20 and the insulating film 23 can be reduced.

Further, it is preferred to form the insulating film 24 without exposure to the atmosphere, directly after the insulating film 23 is formed. After the insulating film 23 is formed, the insulating film 24 is formed directly by adjusting at least one of the flow rate of the source gas, the pressure, the high-frequency power, and the substrate temperature without exposure to the atmosphere, whereby the concentration of impurities at the interface between the insulating film 23 and the insulating film 24 can be reduced and further oxygen contained in the insulating film 24 can be diffused into the oxide semiconductor film 20; accordingly, the amount of oxygen vacancies in the oxide semiconductor film 20 can be reduced.

As the insulating film 23, a silicon oxide film or a silicon oxynitride film is formed under the following conditions: the substrate placed in a treatment chamber of the plasma CVD apparatus, which is vacuum-evacuated, is held at a temperature higher than or equal to 180° C. and lower than or equal to 400° C., preferably higher than or equal to 200° C. and lower than or equal to 370° C., the pressure in the treatment chamber is greater than or equal to 30 Pa and less than or equal to 250 Pa, preferably greater than or equal to 40 Pa and less than or equal to 200 Pa with introduction of a source gas into the treatment chamber, and high-frequency power is supplied to an electrode provided in the treatment chamber.

A deposition gas containing silicon and an oxidizing gas are preferred to be used as the source gas of the insulating film 23. As typical examples of the deposition gas containing silicon, silane, disilane, and trisilane can be cited. As the oxidizing gas, oxygen, ozone, dinitrogen monoxide, nitrogen dioxide, dry air, and the like can be given as examples.

Under the above conditions, the oxide insulating film into which and from which oxygen is diffused can be formed as the insulating film 23. With the insulating film 23, damage to the oxide semiconductor film 20 can be reduced during a later formation process of the insulating film 24.

Note that when the ratio of the amount of the oxidizing gas to the amount of the deposition gas containing silicon is 100 or higher, the hydrogen content in the insulating film 23 can be reduced. Consequently, the amount of hydrogen entering the oxide semiconductor film 20 can be reduced; thus, a change in the threshold voltage of the transistor in the negative direction can be suppressed and leakage current between a source and a drain of the transistor (typically, the off-state current or the like) can be reduced to several yoctoamperes per micrometer to several zeptoamperes per micrometer. Accordingly, electrical characteristics of the transistor can be improved.

Here, as the insulating film 23, a 10-nm-thick silicon oxynitride film is formed by a plasma CVD method under the following conditions: silane with a flow rate of 20 sccm and dinitrogen monoxide with a flow rate of 3000 sccm are used as the source gas, the pressure in the treatment chamber is 40 Pa, the substrate temperature is 220° C., and the high-frequency power of 100 W is supplied to parallel plate electrodes with the use of a 27.12 MHz high-frequency power source. Under the above conditions, a silicon oxynitride film into which and from which oxygen is diffused can be formed.

As the insulating film 24, a silicon oxide film or a silicon oxynitride film is formed under the following conditions: the substrate placed in a treatment chamber of the plasma CVD apparatus, which is vacuum-evacuated, is held at a temperature higher than or equal to 180° C. and lower than or equal to 250° C., preferably higher than or equal to 180° C. and lower than or equal to 230° C., the pressure is greater than or equal to 100 Pa and less than or equal to 250 Pa, preferably greater than or equal to 100 Pa and less than or equal to 200 Pa with introduction of a source gas into the treatment chamber, and high-frequency power higher than or equal to 0.17 W/cm$^2$ and lower than or equal to 0.5 W/cm$^2$, preferably higher than or equal to 0.26 W/cm$^2$ and lower than or equal to 0.35 W/cm$^2$, is supplied to an electrode provided in the treatment chamber.

As the film formation conditions of the insulating film 24, the high-frequency power having the above power density is supplied to the reaction chamber having the above pressure, whereby the degradation efficiency of the source gas in plasma is increased, oxygen radicals are increased, and oxidation of the source gas is promoted; therefore, the oxygen content of the insulating film 24 becomes higher than that in the stoichiometric composition. However, the bonding strength of silicon and oxygen is weak in the above substrate temperature range; therefore, part of oxygen is released by heating. Thus, it is possible to form an oxide insulating film which contains oxygen at a higher proportion than the stoichiometric composition and from which part of oxygen is released by heating. Moreover, the insulating film 23 is provided over the oxide semiconductor film 20. Accordingly, in the process for forming the insulating film 24, the insulating film 23 serves as a protective film of the oxide semiconductor film 20. Consequently, the insulating film 24 can be formed using the high-frequency power having a high power density while damage to the oxide semiconductor film 20 is reduced.

Here, as the insulating film 24, a 400-nm-thick silicon oxynitride film is formed by a plasma CVD method under the following conditions: silane with a flow rate of 160 sccm and dinitrogen monoxide with a flow rate of 4000 sccm are used as the source gas, the pressure in the reaction chamber is 200 Pa, the substrate temperature is 220° C., and the high-frequency power of 1500 W is supplied to parallel plate electrodes with the use of a 27.12 MHz high-frequency power source. Note that the plasma CVD apparatus is a parallel plate plasma CVD apparatus in which the electrode area is 6000 cm$^2$, and the power per unit area (power density) into which the supplied power is converted is 0.25 W/cm$^2$.

Note that the insulating film 24 may be formed by a sputtering method. For example, the substrate 11 temperature is in the range of room temperature to 300° C., a rare gas (typically argon), oxygen, or a mixed gas of a rare gas and oxygen is used as a sputtering gas, and a silicon oxide target or a silicon target is used as a target, whereby an oxide insulating film which contains oxygen at a higher proportion than the stoichiometric composition and from which part of oxygen is released by heating can be formed.

Next, heat treatment is performed. The temperature of the heat treatment is typically higher than or equal to 150° C. and lower than the strain point of the substrate, preferably higher than or equal to 200° C. and lower than or equal to 450° C., more preferably higher than or equal to 300° C. and lower than or equal to 450° C.

An electric furnace, an RTA apparatus, or the like can be used for the heat treatment. With the use of the RTA apparatus, the heat treatment can be performed at a temperature higher than or equal to the strain point of the substrate if the heating time is short. Therefore, the heat treatment time can be shortened.

The heat treatment may be performed under an atmosphere of nitrogen, oxygen, ultra-dry air (air in which a water content is less than or equal to 20 ppm, preferably less than or equal to 1 ppm, more preferably less than or equal to 10 ppb), or a rare gas (e.g., argon or helium). The atmosphere of nitrogen, oxygen, ultra-dry air, or a rare gas is preferred not to contain hydrogen, water, and the like.

Here, the heat treatment is performed at 250° C. under a mixed atmosphere of nitrogen and oxygen for one hour.

Through the above steps, a transistor with excellent electrical characteristics in which a change in the threshold voltage in the negative direction is suppressed can be manufactured. In addition, a transistor in which a change in electrical characteristics due to a change over time or a BT photostress test is small can be manufactured. Typically, a highly reliable transistor in which the threshold voltage changes in a positive direction, and the amount of change is less than or equal to 2.5 V, preferably less than or equal to 1.5 V can be manufactured.

Further, in this embodiment, an opening reaching the pair of electrodes 21 is formed in the protective film 25, and the wiring 22 is formed by filling the opening with a conductive material.

The wiring 22 is formed to have a single-layer structure or a stacked-layer structure including any of metals such as aluminum, titanium, chromium, nickel, copper, yttrium, zirconium, molybdenum, silver, tantalum, and tungsten or an alloy containing any of these metals as its main component. A single-layer structure of an aluminum film containing silicon; a two-layer structure in which a titanium film is stacked over an aluminum film; a two-layer structure in which a titanium film is stacked over a tungsten film; a two-layer structure in which a copper film is formed over a copper-magnesium-aluminum alloy film; a three-layer structure in which a titanium film or a titanium nitride film, an aluminum film or a copper film, and a titanium film or a titanium nitride film are stacked in this order; and a three-layer structure in which a molybdenum film or a molybdenum nitride film, an aluminum film or a copper film, and a molybdenum film or a molybdenum nitride film are stacked in this order can be given as examples. Note that a transparent conductive material containing indium oxide, tin oxide, or zinc oxide may be used.

Figure 11:
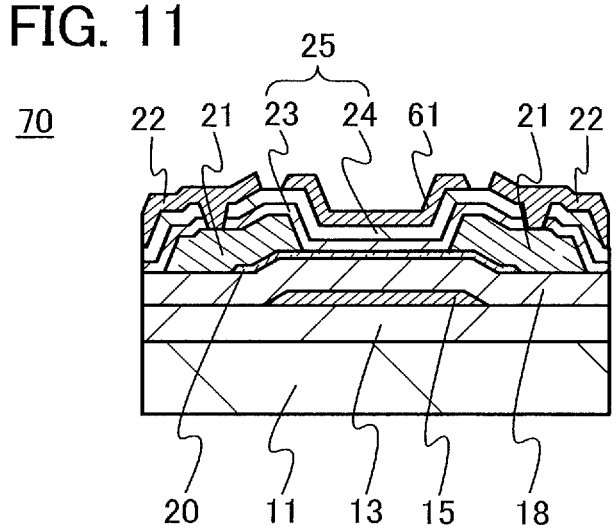
FIG. 11 illustrates one embodiment of a transistor.

FIG. 11 illustrates a transistor 70 which is another mode of this embodiment. The transistor 70 includes a plurality of gate electrodes facing each other with an oxide semiconductor film provided therebetween.

A transistor 70 illustrated in FIG. 11 includes the base insulating film 13 over the substrate 11 and the gate electrode 15 over the base insulating film 13. Moreover, the gate insulating film 18 is formed over the base insulating film 13 and the gate electrode 15, and the oxide semiconductor film 20 overlapping with the gate electrode 15 with the gate insulating film 18 provided therebetween, and the pair of electrodes 21 in contact with the oxide semiconductor film 20 are included. The protective film 25 including the insulating film 23 and the insulating film 24 is over the gate insulating film 18, the oxide semiconductor film 20, and the pair of electrodes 21. Over the protective film 25, the wiring 22 in contact with the pair of electrodes 21 through the opening formed in the protective film 25 and a gate electrode 61 overlapping with the oxide semiconductor film 20 with the protective film 25 provided therebetween are provided.

The gate electrode 61 can be formed in a manner similar to that of the gate electrode 15.

The transistor 70 has the gate electrode 15 and the gate electrode 61 facing each other with the oxide semiconductor film 20 provided therebetween. By application of different potentials to the gate electrode 15 and the gate electrode 61, the threshold voltage of the transistor 70 can be controlled, in a preferable manner, a change in the threshold voltage in the negative direction can be suppressed. Alternatively, when the same potential is applied to the gate electrode 15 and the gate electrode 61, the on-state current of the transistor 70 can be increased. Moreover, the oxide semiconductor film 20 whose surface is exposed to plasma generated in an oxygen atmosphere and the insulating film 23 which is formed in succession after the plasma treatment are included, whereby impurities between the oxide semiconductor film 20 and the gate electrode 61 can be reduced, and a change in the threshold voltage of the transistor 70 can be reduced. Further, with the use of the oxide semiconductor film 20 in which the amount of oxygen vacancies is reduced, a change in the threshold voltage in the negative direction of the transistor 70 can be suppressed. Further, the transistor 70 has the following excellent electrical characteristics: a change in the threshold voltage due to a change over time or a BT photostress test is small, typically the amount of change in the threshold voltage is less than or equal to 2.5 V.

The transistor in this embodiment is a transistor in which threshold voltage in the BT stress test changes only in a positive direction and the amount of change in the threshold voltage is small. The transistor in this embodiment is applied to the light-emitting devices in Embodiment 1 and Embodiment 2, whereby the time required for obtaining the threshold voltage is shortened and variation of the light-emitting devices can be reduced.

This embodiment can be implemented in appropriate combination with the other embodiments.
(Embodiment 5)

A light-emitting device (also referred to as a display device) having a display function can be manufactured using the transistor examples of which are shown in the above embodiments. Moreover, some or all of the driver circuits which include the transistor can be formed over a substrate where the pixel portion is formed, whereby a system-on-panel can be obtained. In this embodiment, an example of a display device using the transistor examples of which are shown in the above embodiments is described with reference to FIGS. 12A to 12C and FIG. 13. FIG. 13 is a cross-sectional view illustrating cross-sectional structures taken along chain line M-N in FIG. 12B.

Figure 12A:
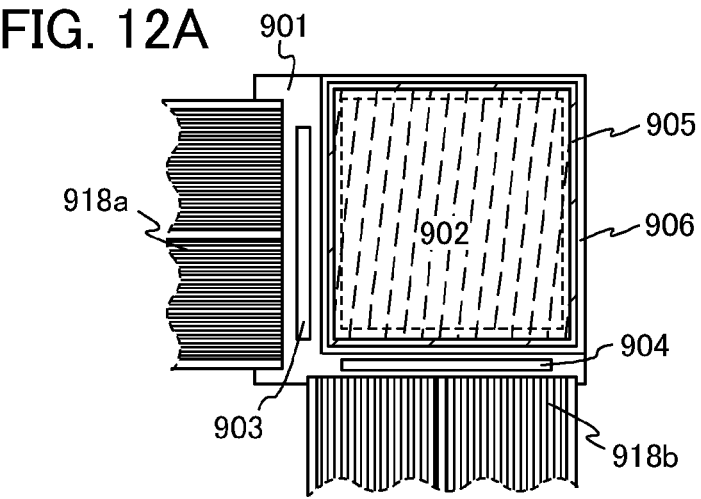
FIGS. 12A to 12C each illustrate one embodiment of a light-emitting device.
Figure 13:
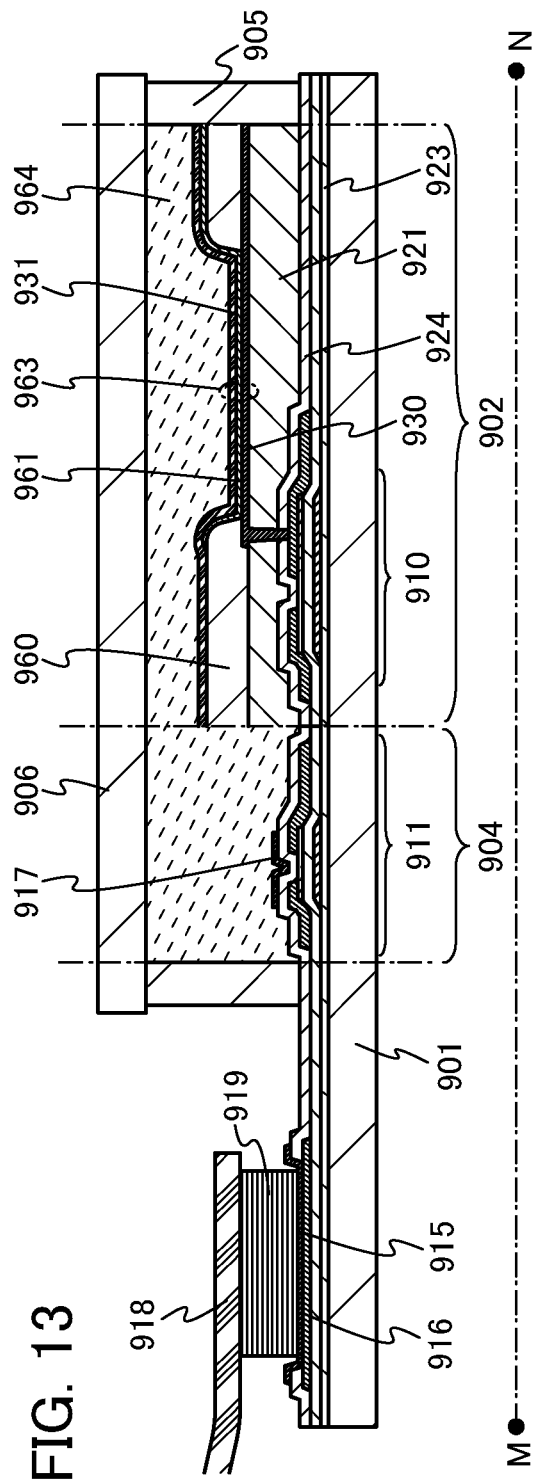
FIG. 13 illustrates one embodiment of a light-emitting device.

In FIG. 12A, a sealant 905 is provided so as to surround a pixel portion 902 provided over a first substrate 901, and the pixel portion 902 is sealed with a second substrate 906. In FIG. 12A, a signal line driver circuit 903 and a scan line driver circuit 904 each are formed using a single crystal semiconductor or a polycrystalline semiconductor over a substrate prepared separately, and mounted in a region different from the region surrounded by the sealant 905 over the first substrate 901. Further, various signals and potentials are supplied to the signal line driver circuit 903, the scan line driver circuit 904, and the pixel portion 902 from flexible printed circuits (FPCs) 918a and 918b.

Figure 12B:
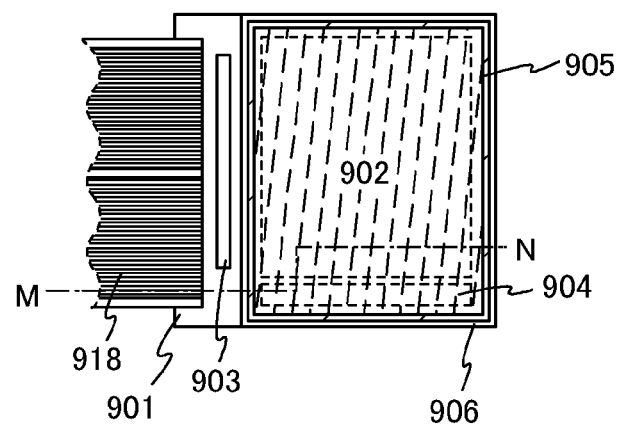
Figure 12C:
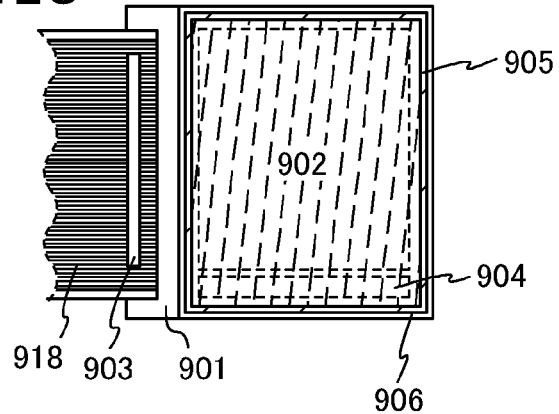

In FIGS. 12B and 12C, the sealant 905 is provided so as to surround the pixel portion 902 and the scan line driver circuit 904 which are provided over the first substrate 901. The second substrate 906 is provided over the pixel portion 902 and the scan line driver circuit 904. Thus, the pixel portion 902 and the scan line driver circuit 904 are sealed together with a display element by the first substrate 901, the sealant 905, and the second substrate 906. In FIGS. 12B and 12C, a signal line driver circuit 903 which is formed using a single crystal semiconductor or a polycrystalline semiconductor over a substrate separately prepared is mounted in a region different from the region surrounded by the sealant 905 over the first substrate 901. In FIGS. 12B and 12C, various signals and potentials are supplied to the signal line driver circuit 903, the scan line driver circuit 904, and the pixel portion 902 from an FPC 918 (an FPC 918a and an FPC 918b).

Although FIGS. 12B and 12C each show an example in which the signal line driver circuit 903 is formed separately and mounted on the first substrate 901, one embodiment of the present invention is not limited to this structure. The scan line driver circuit may be separately formed and then mounted, or only part of the signal line driver circuit or part of the scan line driver circuit may be separately formed and then mounted.

Note that a connection method of a separately formed driver circuit is not particularly limited, and a chip on glass (COG) method, a wire bonding method, a tape automated bonding (TAB) method, or the like can be used. FIG. 12A shows an example in which the signal line driver circuit 903 and the scan line driver circuit 904 are mounted by a COG method. FIG. 12B shows an example in which the signal line driver circuit 903 is mounted by a COG method. FIG. 12C shows an example in which the signal line driver circuit 903 is mounted by a TAB method.

The display device includes in its category a panel in which a display element is sealed and a module in which an IC including a controller or the like is mounted on the panel.

A display device in this specification refers to an image display device, a display device, or a light source (including a lighting device). Further, the display device also includes the following modules in its category: a module to which a connector such as an FPC, a TAB tape, or a TCP is attached; a module having a TCP at the tip of which a printed wiring board is provided; and a module in which an integrated circuit (IC) is directly mounted on a display element by a COG method.

The pixel portion and the scan line driver circuit provided over the first substrate include a plurality of transistors and any of the transistors which are described in the above embodiments can be used.

A light emitting element includes, in its scope, an element whose luminance is controlled by current or voltage, and specifically includes an inorganic electroluminescent (EL) element, an organic EL element, and the like. Further, a display medium whose contrast is changed by an electric effect, such as electronic ink, can be used.

As illustrated in FIG. 13, the semiconductor device includes a connection terminal electrode 915 and a terminal electrode 916. The connection terminal electrode 915 and the terminal electrode 916 are electrically connected to a terminal included in the FPC 918 through an anisotropic conductive agent 919.

The connection terminal electrode 915 is formed using the same conductive film as a first electrode 930, and the terminal electrode 916 is formed using the same conductive film as a pair of electrodes in each of a transistor 910 and a transistor 911.

Each of the pixel portion 902 and the scan line driver circuit 904 which are provided over the first substrate 901 includes a plurality of transistors. FIG. 13 illustrate the transistor 910 included in the pixel portion 902 and the transistor 911 included in the scan line driver circuit 904. An insulating film 924 is provided over the transistor 910 and the transistor 911, and a planarization film 921 is further provided over the insulating film 924. Note that an insulating film 923 serves as a base film.

In this embodiment, any of the transistors described in Embodiment 4 can be used as the transistor 910 and the transistor 911.

Moreover, FIG. 13 shows an example in which a conductive film 917 is provided over the insulating film 924 so as to overlap with a channel formation region of the oxide semiconductor film of the transistor 911 for the driver circuit. In this embodiment, the conductive film 917 is formed using the same conductive film as the first electrode 930. By providing the conductive film 917 so as to overlap with the channel formation region of the oxide semiconductor film, the amount of change in the threshold voltage of the transistor 911 between before and after a BT stress test can be further reduced. The conductive film 917 may have the same potential as or a potential different from that of the gate electrode of the transistor 911, and the conductive film 917 can serve as a second gate electrode. The potential of the conductive film 917 may be GND, 0 V or in a floating state.

In addition, the conductive film 917 has a function of blocking an external electric field. In other words, the conductive film 917 has a function of preventing an external electric field (particularly, a function of preventing static electricity) from affecting the inside (a circuit portion including the transistor). Such a blocking function of the conductive film 917 can prevent change in electrical characteristics of the transistor due to the influence of an external electric field such as static electricity. The conductive film 917 can be used for any of the transistors described in the above embodiments.

In the display panel, the transistor 910 included in the pixel portion 902 is electrically connected to a display element. There is no particular limitation on the kind of the display element as long as display can be performed, and various kinds of display elements can be used.

Further, as the display element included in the display device, a light-emitting element utilizing electroluminescence (hereinafter, referred to as an EL element) can be used. The EL element is classified according to whether a light-emitting material is an organic compound or an inorganic compound. In general, the former is referred to as an organic EL element, and the latter is referred to as an inorganic EL element.

In the organic EL element, by application of voltage to a light-emitting element, electrons and holes are separately injected from a pair of electrodes into a layer containing a light-emitting organic compound, and current flows. The carriers (electrons and holes) are recombined, and thus, the light-emitting organic compound is excited. The light-emitting organic compound returns to a ground state from the excited state, thereby emitting light. Owing to such a mechanism, this light-emitting element is referred to as a current-excitation light-emitting element.

The inorganic EL elements are classified according to their element structures into a dispersion-type inorganic EL element and a thin-film inorganic EL element. The dispersion-type inorganic EL element has a light-emitting layer where particles of a light-emitting material are dispersed in a binder, and its light emission mechanism is donor-acceptor recombination type light emission that utilizes a donor level and an acceptor level. The thin-film inorganic EL element has a structure where a light-emitting layer is sandwiched between dielectric layers, which are further sandwiched between electrodes, and its light emission mechanism is localized type light emission that utilizes inner-shell electron transition of metal ions. Note that an example of an organic EL element as an EL element is described here.

In order to extract light emitted from the EL element, it is acceptable as long as at least one of a pair of electrodes is transparent. A transistor and an EL element are formed over a substrate. The EL element can have a top emission structure in which light emission is extracted through the surface opposite to the substrate; a bottom emission structure in which light emission is extracted through the surface on the substrate side; or a dual emission structure in which light emission is extracted through the surface opposite to the substrate and the surface on the substrate side, and an EL element having any of these emission structures can be used.

FIG. 13 illustrates an example of a light-emitting device using an EL element. An EL element 963 which is a display element is electrically connected to the transistor 910 provided in the pixel portion 902. Note that although the structure of the EL element 963 is a stacked-layer structure of the first electrode 930, a light-emitting layer 961, and the second electrode 931, the structure is not limited thereto. The structure of the EL element 963 can be changed as appropriate depending on the direction in which light is extracted from the EL element 963, or the like.

A partition wall 960 can be formed using an organic insulating material or an inorganic insulating material. It is particularly preferred that the partition wall 960 be formed using a photosensitive resin material to have an opening over the first electrode 930 so that a sidewall of the opening has an inclined surface with a continuous curvature.

The light-emitting layer 961 may be formed to have a single-layer structure or a stacked-layer structure including a plurality of layers.

A protective layer may be formed over the second electrode 931 and the partition wall 960 in order to prevent oxygen, hydrogen, moisture, carbon dioxide, or the like from entering the light-emitting element 963. As the protective layer, a silicon nitride film, a silicon nitride oxide film, an aluminum oxide film, an aluminum nitride film, an aluminum oxynitride film, an aluminum nitride oxide film, a DLC film, or the like can be formed. In addition, in a space which is sealed with the first substrate 901, the second substrate 906, and a sealant 905, a filler 964 is provided and sealed. It is preferred that, in this manner, the EL element be packaged (sealed) with a protective film (such as a laminate film or an ultraviolet curable resin film) or a cover material with high air-tightness and little degasification so that the panel is not exposed to the outside air.

As the filler 964, as well as an inert gas such as nitrogen or argon, an ultraviolet curable resin or a thermosetting resin can be used: polyvinyl chloride (PVC), an acrylic resin, polyimide, an epoxy resin, a silicone resin, polyvinyl butyral (PVB), ethylene vinyl acetate (EVA), or the like can be used. For example, nitrogen is used for the filler.

If necessary, an optical film such as a polarizing plate, a circularly polarizing plate (including an elliptically polarizing plate), a retardation plate (a quarter-wave plate or a half-wave plate), or a color filter may be provided as appropriate for a light-emitting surface of the light-emitting element. Further, a polarizing plate or a circularly polarizing plate may be provided with an anti-reflection film. For example, anti-glare treatment by which reflected light can be diffused by projections and depressions on the surface so as to reduce the glare can be performed.

The first electrode and the second electrode (each of which are also referred to as a pixel electrode, a common electrode, a counter electrode layer, or the like) for applying voltage to the EL element can have light-transmitting properties or light-reflecting properties, which depends on the direction in which light is extracted, the position where the electrodes are provided, and the pattern structure of the electrodes.

The first electrode 930 and the second electrode 931 can be formed using a light-transmitting conductive material such as an In—W oxide, an In—W—Zn oxide, an In—Ti oxide, an In—Sn—Ti oxide, an In—Sn oxide, an In—Zn oxide, and an In—Sn oxide to which silicon oxide is added.

Alternatively, the first electrode 930 and the second electrode 931 can be formed using one or more materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of any of these metals; and a nitride of any of these metals.

The first electrode 930 and the second electrode 931 can be formed using a conductive composition including a conductive macromolecule (also referred to as a conductive polymer). The conductive macromolecule, known as a π-electron conjugated conductive macromolecule, can be used. Polyaniline or a derivative thereof, polypyrrole or a derivative thereof, polythiophene or a derivative thereof, a copolymer of two or more of aniline, pyrrole, and thiophene or a derivative thereof can be given as examples.

Since the transistor is easily broken owing to static electricity or the like, a protective circuit for protecting the driver circuit is preferred to be provided. The protection circuit is preferred to be formed using a nonlinear element.

As described above, by applying the light-emitting device in the above embodiment, a display device having high display quality can be obtained.

This embodiment can be implemented in appropriate combination with the other embodiments.

(Embodiment 6)

A light-emitting device disclosed in this specification can be applied to a variety of electronic devices (including game machines). Examples of the electronic devices include television sets (also referred to as televisions or television receivers), monitors of computers or the like, cameras such as digital cameras or digital video cameras, digital photo frames, cellular phones (also referred to as mobile phones or cellular phone sets), portable game consoles, portable information terminals, audio reproducing devices, large-sized game machines such as pachinko machines, electronic paper, and the like. The electronic paper can be used for electronic devices for displaying information in a variety of fields. For example, the electronic paper can be applied to an electronic book (e-book) reader, a poster, an advertisement in a vehicle such as a train, a digital signage, a public information display (PID), displays of various cards such as a credit card, and the like. The portable information terminal which is an example of electronic devices is described with reference to FIGS. 14A to 14C.

FIGS. 14A and 14B illustrate a foldable tablet terminal FIG. 14A illustrates the tablet terminal which is unfolded. The tablet terminal includes a housing 9630, a display portion 9631*a*, a display portion 9631*b*, a display mode switch 9034, a power switch 9035, a power-saving mode switch 9036, a clasp 9033, and an operation switch 9038.

Part of the display portion 9631*a* can be a touch panel region 9632*a*, and data can be input by touching operation keys 9638 that are displayed. Although a structure in which a half region in the display portion 9631*a* has only a display function and the other half region has a touch panel function is shown as an example, the display portion 9631*a* is not limited to this structure. The whole region in the display portion 9631*a* may have a touch panel function. For example, the display portion 9631*a* can display keyboard buttons in the whole region to be a touch panel, and the display portion 9631*b* can be used as a display screen.

In a manner similar to that of the display portion 9631*a*, part of the display portion 9631*b* can be a touch panel region 9632*b*. When a keyboard display switching button 9639 displayed on the touch panel is touched with a finger, a stylus, or the like, a keyboard can be displayed on the display portion 9631*b*.

Touch input can be performed in the touch panel region 9632*a* and the touch panel region 9632*b* at the same time.

The display mode switch 9034 can switch the display between a portrait mode and a landscape mode, and between monochrome display and color display, for example. The power-saving mode switch 9036 can control display luminance to be optimal in accordance with the amount of external light in use of the tablet terminal which is detected by an optical sensor incorporated in the tablet terminal. Another detection device including a sensor for detecting inclination, such as a gyroscope or an acceleration sensor, may be incorporated in the tablet terminal, in addition to the optical sensor.

Although the display portion 9631*a* and the display portion 9631*b* have the same display area in FIG. 14A as an example, one embodiment of the present invention is not particularly limited to this example. The display portion 9631*a* and the display portion 9631*b* may have different areas or different display quality. For example, higher definition images may be displayed on one of the display portion 9631*a* and the display portion 9631*b*. The light-emitting device in the above embodiment is used for the display portion 9631*a* and the display portion 9631*b*, whereby a display device in which the display portion 9631*a* and the display portion 9631*b* have high display quality can be obtained.

FIG. 14B illustrates the tablet terminal which is folded. The tablet terminal includes the housing 9630, a solar battery 9633, a charge and discharge control circuit 9634, a battery 9635, and a DC-DC converter 9636. As an example, FIG. 14B illustrates the charge and discharge control circuit 9634 including the battery 9635 and the DC-DC converter 9636.

Since the tablet terminal can be folded, the housing 9630 can be closed when not in use. Thus, the display portion 9631*a* and the display portion 9631*b* can be protected, which makes it possible to provide a tablet terminal with high durability and improved reliability for long-term use.

The tablet terminal illustrated in FIGS. 14A and 14B can also have a function of displaying various kinds of data (e.g., a still image, a moving image, and a text image), a function of displaying a calendar, the date, the time, or the like on the display portion, a touch-input function of operating or editing data displayed on the display portion by touch input, a function of controlling processing by various kinds of software (programs), and the like.

The solar battery 9633, which is attached on a surface of the tablet terminal, can supply electric power to a touch panel, a display portion, an image signal processor, and the like. Note that the solar battery 9633 can be provided on one or both surfaces of the housing 9630, so that the battery 9635 can be charged efficiently, which is preferable.

The structure and operation of the charge and discharge control circuit 9634 illustrated in FIG. 14B is described with reference to a block diagram in FIG. 14C. FIG. 14C illustrates the solar battery 9633, the battery 9635, the DC-DC converter 9636, a converter 9637, switches SW1 to SW3, and the display portion 9631. The battery 9635, the DC-DC converter 9636, the converter 9637, and the switches SW1 to SW3 correspond to the charge and discharge control circuit 9634 illustrated in FIG. 14B.

First, an example of operation in the case where power is generated by the solar battery 9633 using external light is described. The voltage of power generated by the solar battery 9633 is raised or lowered by the DC-DC converter 9636 so that a voltage for charging the battery 9635 is obtained. When the display portion 9631 is operated with the power from the solar battery 9633, the switch SW1 is turned on and the voltage of the power is raised or lowered by the converter 9637 to a voltage needed for operating the display portion 9631. In addition, when display on the display portion 9631 is not performed, the switch SW1 is turned off and the switch SW2 is turned on so that charge of the battery 9635 may be performed.

Although the solar battery 9633 is shown as an example of a power generation means, there is no particular limitation on the power generation means and the battery 9635 may be charged with another power generation means such as a piezoelectric element or a thermoelectric conversion element (Peltier element). For example, the battery 9635 may be charged with a non-contact power transmission module which is capable of charging by transmitting and receiving power by wireless (without contact), or another charge means used in combination.

The present invention is not limited to the electric device illustrated in FIGS. 14A to 14C as long as the light-emitting device described in any of the above embodiments is included.

This embodiment can be implemented in appropriate combination with the other embodiments.

EXAMPLE 1

In this example, measurement results of a positive BT stress test and a positive BT photostress test of a transistor which can be used for a light-emitting device of one embodiment of the present invention are described. Specifically, an amount of change in the threshold voltage of the transistor will be described.

First, a process of manufacturing samples A1 to A4 in this example is described with reference to FIGS. 15A to 15D.

Figure 15A:
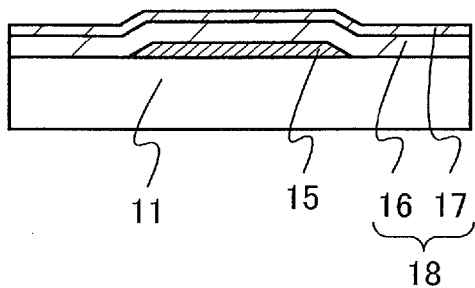
FIGS. 15A to 15D illustrate a method for manufacturing a sample in Example 1.

First, a gate electrode 15 was formed over a substrate 11 which is a glass substrate. Next, the gate insulating film 18 including the insulating film 16 and the insulating film 17 was formed over the gate electrode 15 (FIG. 15A).

The gate electrode 15 was formed as follows: a 100-nm-thick tungsten film was formed by a sputtering method, a mask was formed over the tungsten film by a photolithography process, and the tungsten film was partly etched using the mask.

A 50-nm-thick silicon nitride film was formed as the insulating film 16, and a 200-nm-thick silicon oxynitride film was formed as the insulating film 17. The silicon nitride film was formed under the following conditions: silane with a flow rate of 50 sccm and nitrogen with a flow rate of 5000 sccm were supplied to a reaction chamber of a plasma CVD apparatus, the pressure in the reaction chamber was controlled to 60 Pa, and the power of 150 W was supplied with the use of a 27.12 MHz high-frequency power source. The silicon oxynitride film was formed under the following conditions: silane with a flow rate of 20 sccm and nitrogen with a flow rate of 3000 sccm were supplied to a reaction chamber of the plasma CVD apparatus, the pressure in the reaction chamber was controlled to 40 Pa, and the power of 100 W was supplied with the use of a 27.12 MHz high-frequency power source. The substrate temperatures at which the silicon nitride film and the silicon oxynitride film are formed each were 350° C.

Figure 15B:
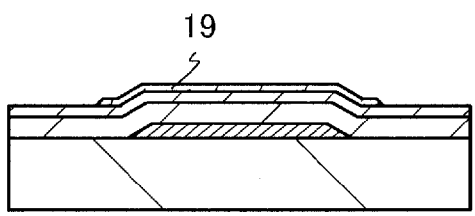

Next, the oxide semiconductor film 19 overlapping with the gate electrode 15 with the gate insulating film 18 provided therebetween was formed (FIG. 15B).

Here, an IGZO film which was a CAAC-OS film was formed over the gate insulating film 18 by a sputtering method, a mask is formed over the IGZO film by a photolithography process, and the IGZO film was partly etched using the mask. Then, the etched IGZO film was subjected to heat treatment, so that the oxide semiconductor film 19 was formed. In this example, a 35-nm-thick IGZO film was formed.

The IGZO film was formed under the following conditions: a sputtering target containing In, Ga, and Zn at an atomic ratio of 1:1:1 was used, argon with a flow rate of 50 sccm and oxygen with a flow rate of 50 sccm were supplied as a sputtering gas to a reaction chamber of a sputtering apparatus, the pressure in the reaction chamber was controlled to be 0.6 Pa, and the direct current power of 5 kW was supplied. Note that the IGZO film was formed at a substrate temperature of 170° C.

As the heat treatment, heating at 450° C. under a nitrogen atmosphere for one hour and then heating at 450° C. under a mixed atmosphere of nitrogen and oxygen for one hour were performed.

Figure 15C:
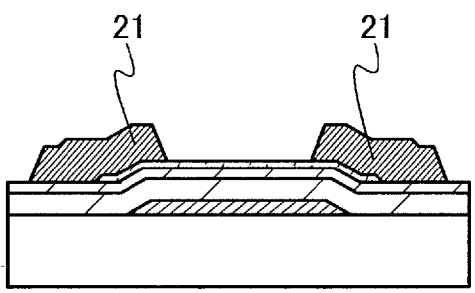
Figure 15D:
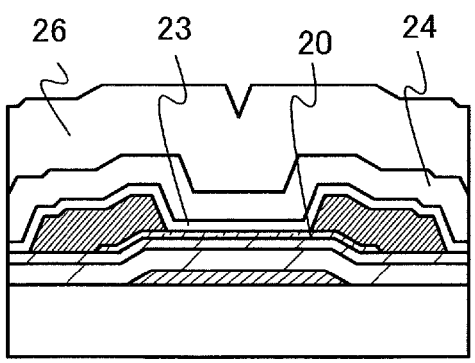

Next, the pair of electrodes 21 (a source electrode and a drain electrode) which is in contact with the oxide semiconductor film 19 was formed (FIG. 15C).

A conductive film was formed over the gate insulating film 18 and the oxide semiconductor film 19, a mask was formed over the conductive film by a photolithography process, and the conductive film was partly etched using the mask, so that the pair of electrodes 21 was formed. Note that as the conductive film, a 400-nm-thick aluminum film was formed over a 50-nm-thick tungsten film, and a 100-nm-thick titanium film was formed over the aluminum film.

Next, the substrate was moved to a treatment chamber filled with dinitrogen monoxide. Then, the oxide semiconductor film 20 illustrated in FIG. 15D was formed by exposing the oxide semiconductor film 19 to plasma which was generated in such a manner that an upper electrode provided in the reaction chamber was supplied with high-frequency power of 150 W with the use of a 27.12 MHz high-frequency power source.

Next, the insulating film 23 was formed in succession over the oxide semiconductor film 20 and the pair of electrodes 21 without exposure to the atmosphere after the above plasma treatment.

As the insulating film 23 (a silicon oxynitride film A) in the samples A1 to A3, a silicon oxynitride film was formed by a plasma CVD method under the following conditions: silane with a flow rate of 30 sccm and dinitrogen monoxide with a flow rate of 4000 sccm were used as a source gas, the pressure in a reaction chamber was 40 Pa, the substrate temperature was 220° C., and a high-frequency power of 150 W was supplied to parallel plate electrodes. A sample in which the thickness of the insulating film 23 is 20 nm is referred to as the sample μl, a sample in which the thickness of the insulating film 23 is 50 nm is referred to as the sample A2, and a sample in which the thickness of the insulating film 23 is 100 nm is referred to as the sample A3. Note that since the substrate temperature in this process is 220° C. which is relatively low, the silicon oxynitride film in some cases resulted in a silicon oxide film hardly containing nitrogen. Moreover since the substrate temperature in this process is 220° C. which is relatively low, the amount of released hydrogen in the film formation process is small compared with that in the film formation process at a higher temperature than 220° C. (e.g., 350° C.); therefore, the silicon oxynitride film (silicon oxide film) contain hydrogen in some cases.

As the insulating film 23 in the sample A4 (a silicon oxynitride film B), a 20-nm-thick silicon oxynitride film was formed by a plasma CVD method under the following conditions: silane with a flow rate of 20 sccm and dinitrogen monoxide with a flow rate of 3000 sccm were used as a source gas, the pressure in the reaction chamber was 200 Pa, the substrate temperature was 350° C., and the high-frequency power of 100 W was supplied to parallel plate electrodes.

Next, the insulating film 24 was formed over the insulating film 23.

As the insulating film 24, a silicon oxynitride film was formed by a plasma CVD method under the following conditions: silane with a flow rate of 160 sccm and dinitrogen monoxide with a flow rate of 4000 sccm were used as a source gas, the pressure in a reaction chamber was 200 Pa, the substrate temperature was 220° C., and the high-frequency power of 1500 W was supplied to an upper electrode of parallel plate electrodes. Under the above conditions, it is possible to form a silicon oxynitride film which contains oxygen at a higher proportion than the stoichiometric composition and from which part of oxygen is released by heating. Note that the thickness of the silicon oxynitride film was 400 nm in the samples A1 to A3, and the thickness of the silicon oxynitride film was 380 nm in the sample A4.

Next, heat treatment was performed. The heat treatment was performed at 350° C. under a mixed atmosphere of oxygen and nitrogen for one hour.

Next, an insulating film 26 was formed over the insulating film 24. Here, a 1.5-μm-thick acrylic resin was formed as the insulating film 26. After that, heat treatment was performed. The heat treatment was performed at 250° C. under an atmosphere containing nitrogen for one hour.

Through the above process, the samples A1 to A4 were manufactured.

Here, a process of manufacturing a comparative sample μl is described. The structure and the method for manufacturing the comparative sample μl are similar to those of the samples A1 to A4 except that the insulating film 23 is not formed.

Next, a positive BT stress test and a positive BT photostress test were performed on each of the samples A1 to A4 and the comparative sample μl. Here, the positive BT stress test in which voltage was applied to the gate electrode was performed under the following conditions: the substrate temperature was 80° C., the intensity of an electric field applied to the gate insulating film was 1.28 MV/cm, and the application time was 2000 seconds.

Under conditions similar to those of the above positive BT stress test, the positive BT photostress test in which the transistor is irradiated with white LED light of 3000 1x (the irradiation intensity is about 0.22 mW/cm$^2$) to apply voltage to the gate electrode was performed.

Here, a measurement method of the positive BT stress test is described. To measure initial characteristics of the transistor subjected to the positive BT stress test, a change in characteristics of current between the source and the drain (drain current), that is, Vg-Id characteristics were measured under the following conditions: the substrate temperature was 25° C., the voltage between the source and the drain (the drain voltage) was 1 V or 10 V, and the voltages between the source and the gate (the gate voltage) was changed from −20 V to +15 V.

Next, the substrate temperature was raised to 80° C., and then, the potentials of the source and the drain of the transistor were set to 0 V. Then, voltage was kept being applied to the gate electrode for 2000 seconds so that the intensity of the electric field applied to the gate insulating film was 1.28 MV/cm.

Note that in a negative BT stress test, a voltage of −30 V was applied to the gate electrode, and in a positive BT stress test, a voltage of 30 V was applied to the gate electrode. In a negative BT photostress test, a voltage of −30 V was applied to the gate electrode while irradiation with white LED light of 3000 1x was performed, and in a positive BT photostress test, a voltage of 30 V was applied to the gate electrode while irradiation with white LED light of 3000 1x was performed.

Next, the substrate temperature was lowered to 25° C. while voltage was continuously applied to the gate electrode, and the source electrode and the drain electrode. After the substrate temperature was reached to 25° C., the application of voltage to the gate electrode, and the source electrode and the drain electrode was stopped.

Figure 16:
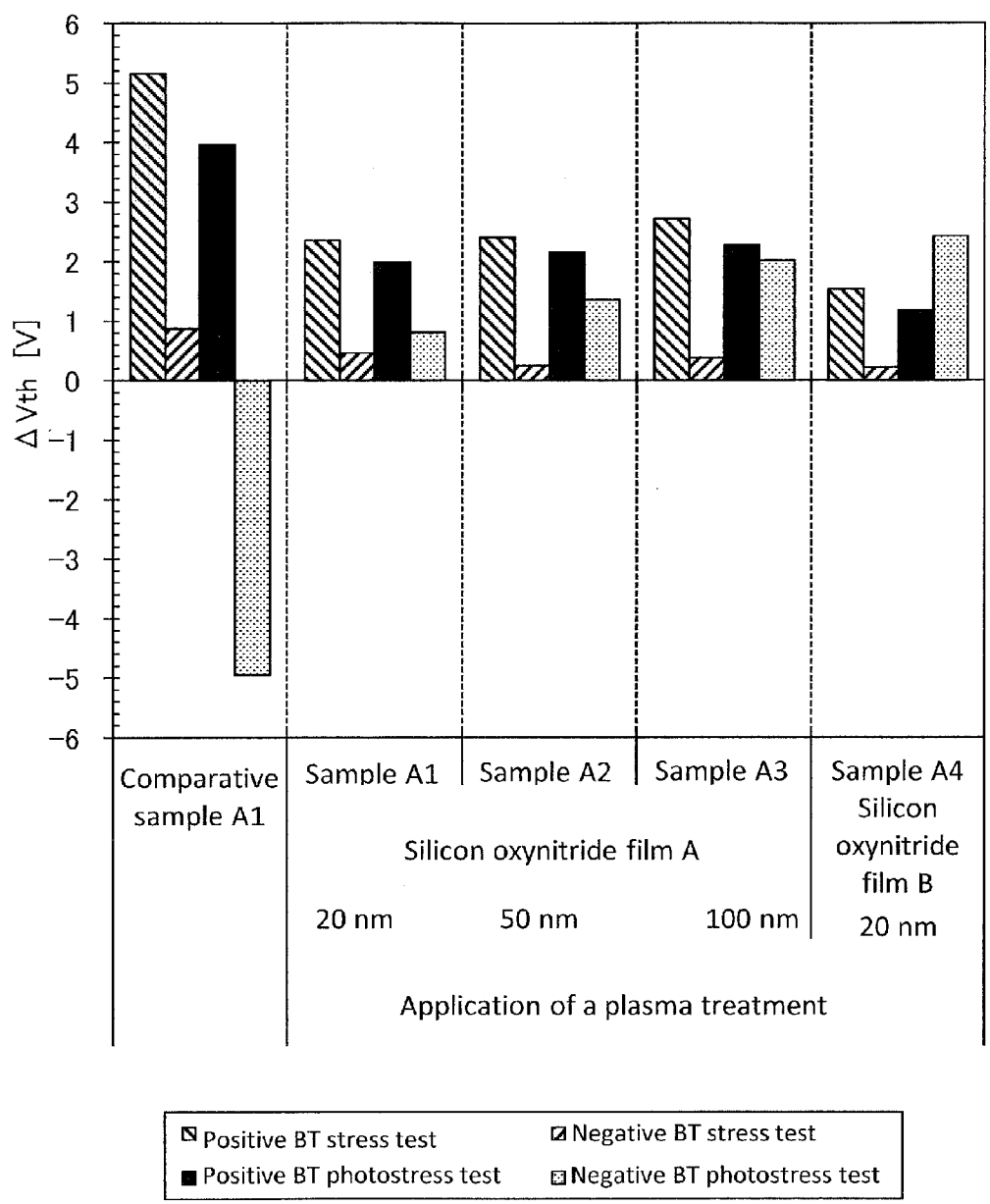
FIG. 16 shows threshold voltage of transistors in Example 1.

Next, Vg-Id characteristics were measured under the same conditions as the measurement of the initial characteristics, and Vg-Id characteristics after the positive BT stress test and the positive BT photostress test were obtained. FIG. 16 shows a difference between threshold voltage in the initial characteristics and threshold voltage after these tests (i.e., the amount of change in the threshold voltage (ΔVth)). The vertical axis represents ΔVth.

Figure 17:
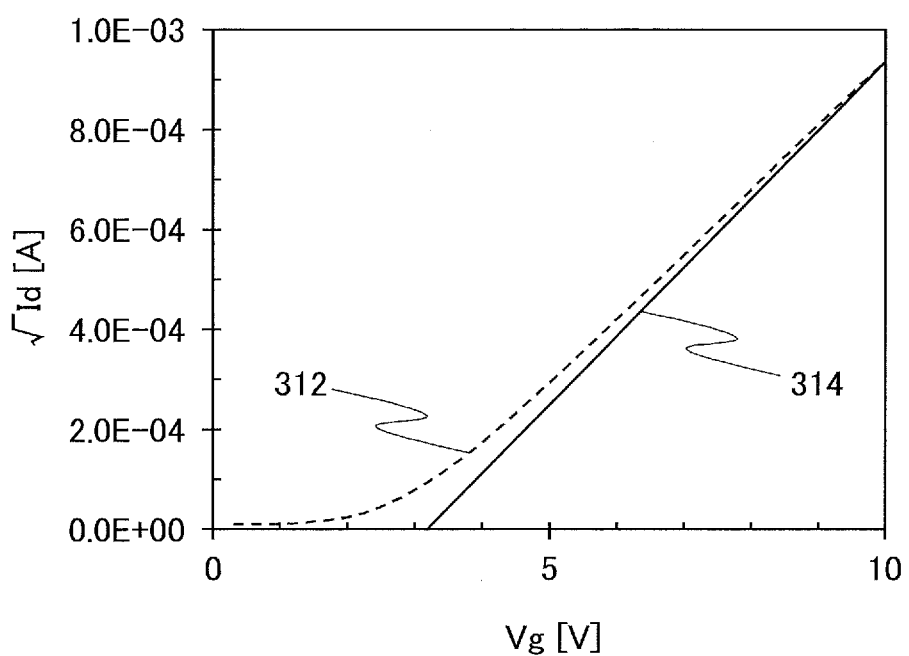
FIG. 17 shows definitions of the threshold voltage in Example 1.

Here, a threshold voltage is described with reference to FIG. 17.

In this specification, in a curve 312 where the horizontal axis indicates the gate voltage (Vg [V]) and the vertical axis indicates the square root of drain current (Id$^{1/2}$ [A]), the threshold voltage (Vth) is defined as a gate voltage at a point of intersection of an extrapolated tangent line 314 of Id$^{1/2}$ having the highest inclination with the Vg axis (i.e., d$^{1/2}$ of 0 A). Note that in this specification, threshold voltage was calculated with a drain voltage Vd of 10 V.

FIG. 16 shows that in the negative BT photostress test in the comparative sample Al, the threshold voltage shifts in the negative direction and the amount of change (ΔVth) is large; however, in the BT stress test and the BT photostress test in the samples A1 to A4, the threshold voltage entirely shifts in the positive direction and the amount of change (ΔVth) is small, e.g., less than or equal to 2.5 V.

Accordingly, it is found that, when an oxide insulating film into which and from which oxygen is diffused and an oxide insulating film which contains oxygen at a higher proportion than the stoichiometric composition are stacked as a protective film of a transistor, the amount of change in threshold voltage of a transistor in the positive BT stress test and the positive BT photostress test can be suppressed.

EXAMPLE 2

In this example, diffusion of oxygen into and from the insulating film 23 of the transistor described in Embodiment 4 will be described with reference to FIGS. 18A and 18B. In this example, the diffusion of oxygen was examined by measuring the concentration of oxygen by substrate side depth profile secondary ion mass spectrometry (SSDP-SIMS) (SIMS from the back side).

First, a method for forming a sample B1 and a sample B2 is described.

A 100-nm-thick silicon oxynitride (SiON) film was formed over a silicon wafer under the conditions of the insulating film 23, which is described in Embodiment 2. Here, the silicon oxynitride film was formed under the following conditions: the silicon wafer was placed in a treatment chamber of a plasma CVD apparatus, silane with a flow rate of 30 sccm and dinitrogen monoxide with a flow rate of 4000 sccm which were used as a source gas were supplied to the treatment chamber, the pressure in the treatment chamber was controlled to 200 Pa, and the power of 150 W was supplied with the use of a 27.12 MHz high-frequency power source. The silicon oxynitride film was formed at a temperature of the silicon wafer being 220° C. Note that the plasma CVD apparatus used in this example is a parallel plate plasma CVD apparatus in which the electrode area is 6000 cm$^2$, and the power per unit area (power density) into which the supplied power is converted is 0.025 W/cm$^2$.

Next, a 100-nm-thick silicon oxide (SiO$_x$) film was formed over the silicon oxynitride film by a sputtering method. Here, the silicon oxide film containing $^{18}$O was formed under the following conditions: the silicon wafer was placed in a treatment chamber of a sputtering apparatus, $^{18}$O (an isotope of $^{16}$O) with a flow rate of 300 sccm which was used as a source gas was supplied to the treatment chamber, the pressure in the treatment chamber was controlled to 0.7 Pa, and the power of 8000 W was supplied with the use of a high-frequency power source. This sample is referred to as the sample B1.

Next, the sample B1 was heated at 350° C. for one hour. This sample is referred to as the sample B2.

Next, the concentration profiles of $^{18}O$ contained in each of the samples B1 and B2 were measured by SSDP-SIMS (measurement from the back side, here from the silicon wafer side).

Other than $^{16}O$ which is a main nuclide in oxygen, isotopes such as $^{17}O$ and $^{18}O$ exist. It is known that the proportions of $^{17}O$ and $^{18}O$ in all of the oxygen atoms in nature are about 0.038 atomic % and about 0.201 atomic %, respectively. That is, the concentrations of $^{17}O$ and $^{18}O$ can be estimated by measuring the concentration of $^{16}O$ in the silicon oxynitride film by SIMS. Here, the concentration of $^{18}O$ in the silicon oxynitride film and the concentration of $^{18}O$ estimated from its proportion to $^{16}O$ are compared, whereby whether $^{18}O$ is diffused or not into the silicon oxynitride film can be judged.

Here, the concentration of $^{18}O$ in the silicon oxynitride film was measured. Note that a cesium primary ion ($Cs^+$) may be used as a primary ion species.

Figure 18A:
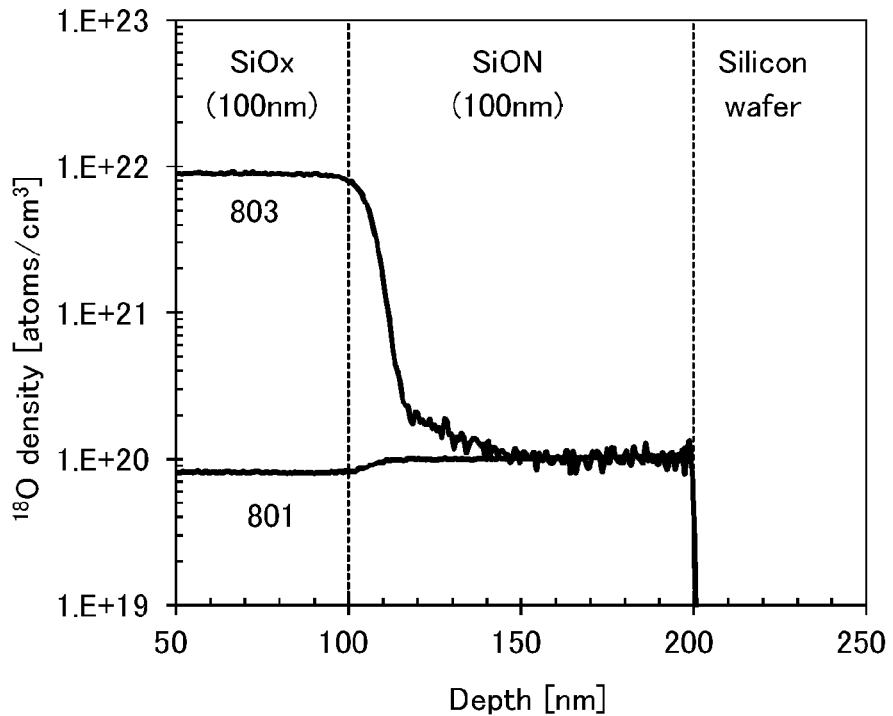
FIGS. 18A and 18B show SIMS measurement results from a back side in Example 2.
Figure 18B:
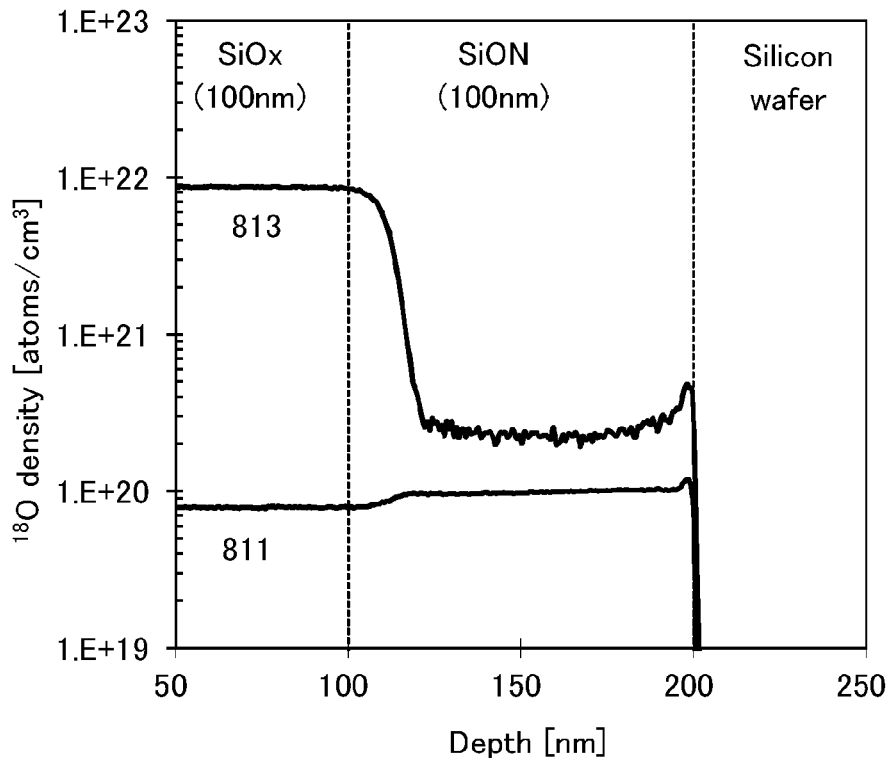

FIGS. 18A and 18B each show the concentration profiles of $^{18}O$ which were obtained by the SSDP-SIMS measurement.

FIG. 18A shows the measurement result of the sample B1. A curve 801 is the concentration profile of $^{18}O$ which was calculated on the basis of the concentration profile of $^{16}O$ measured by SSDP-SIMS, and a curve 803 is the concentration profile of $^{18}O$ measured by SSDP-SIMS.

FIG. 18B shows the measurement result of the sample B2. A curve 811 is the concentration profile of $^{18}O$ which was calculated on the basis of the concentration profile of $^{16}O$ measured by SSDP-SIMS, and a curve 813 is the concentration profile of $^{18}O$ measured by SSDP-SIMS.

In the SiON in FIG. 18A, a region where the curve 801 and the curve 803 coincide with each other can be seen. That is, it is found that $^{18}O$ contained in the $SiO_x$ can not be diffused into the SiON (the SiON has a low diffusion coefficient of $^{18}O$) in the sample B1.

On the other hand, the value of the curve 813 is larger than that of the curve 811 in the whole SiON in FIG. 18B. That is, it is found that $^{18}O$ contained in the $SiO_x$ can be diffused into the SiON by the heat treatment (the SiON has a high diffusion coefficient of $^{18}O$) and the concentration of $^{18}O$ in the SiON is increased.

As described above, oxygen is diffused into the silicon oxynitride film formed under the conditions of the insulating film 23, which is described in Embodiment 2. That is, excess oxygen contained in an insulating film in contact with the silicon oxynitride film can be diffused into the silicon oxynitride film.

EXAMPLE 3

In this example, change in defects of the oxide semiconductor film which is caused at the same time as the formation of the insulating film 23 and the insulating film 24 described in Example 2 will be described with reference to FIGS. 19A to 19C, FIGS. 20A to 20C, and FIG. 21. In this example, results of electron spin resonance (ESR) by which the amount of oxygen vacancies in the oxide semiconductor film was measured will be described.

Figure 19A:
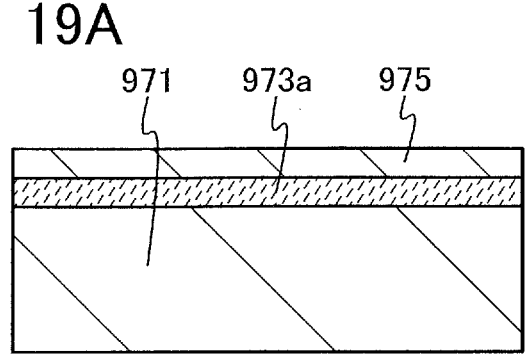
FIGS. 19A to 19C each show a sample in Example 3.
Figure 19B:
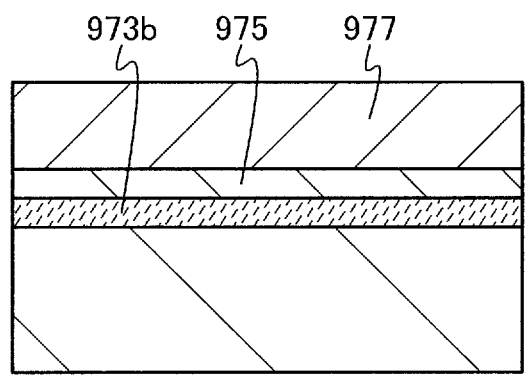
Figure 19C:
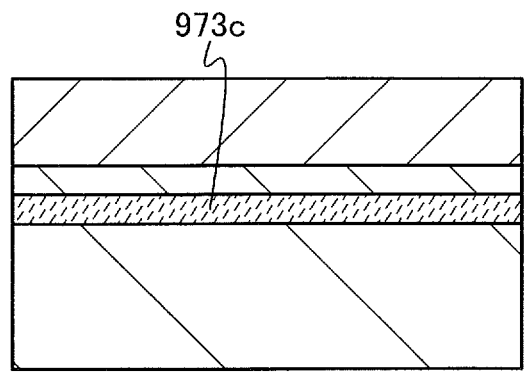

First, a method for forming samples C1, samples C2, and samples C3 which are illustrated in FIGS. 19A to 19C is described.

A method for forming the sample C1 illustrated in FIG. 19A is described.

A 100-nm-thick IGZO film 973a which was a CAAC-OS film was formed by a sputtering method over a quartz substrate 971. Here, the IGZO film was formed under the following conditions: a sputtering target containing In, Ga, and Zn at an atomic ratio of 1:1:1 was used, argon with a flow rate of 50 sccm and oxygen with a flow rate of 50 sccm were supplied as a sputtering gas to a reaction chamber of a sputtering apparatus, the pressure in the reaction chamber was controlled to 0.6 Pa, and the direct current power of 5 kW was supplied. Note that the IGZO film was formed at a substrate temperature of 170° C.

Next, a silicon oxynitride film 975 ($1^{st}$-SiON) was formed over the IGZO film 973a under the conditions of the insulating film 23, which is described in Example 2. Here, the silicon oxynitride film 975 was formed under the following conditions: the quartz substrate was placed in a treatment chamber of a plasma CVD apparatus, silane with a flow rate of 30 sccm and dinitrogen monoxide with a flow rate of 4000 sccm which were used as a source gas were supplied to the treatment chamber, and the power of 150 W was supplied with the use of a 27.12 MHz high-frequency power source. The silicon oxynitride film was formed at a temperature of the silicon wafer being 220° C. Note that the plasma CVD apparatus used in this example is a parallel plate plasma CVD apparatus in which the electrode area is 6000 $cm^2$, and the power per unit area (power density) into which the supplied power is converted is 0.025 $W/cm^2$.

A plurality of samples C1 were formed in such a manner that the pressure in the treatment chamber was controlled to 40 Pa, 120 Pa, or 200 Pa and the silicon oxynitride films 975 were formed to thicknesses of 20 nm, 50 nm, or 100 nm.

Next, a method for forming samples C2 illustrated in FIG. 19B is described.

A silicon oxynitride film 977 was formed over a sample C1 under the conditions of the insulating film 24 formation, which is described in Embodiment 2. Here, the 400-nm-thick silicon oxynitride film was formed by a plasma CVD method under the following conditions: the quartz substrate was placed in a reaction chamber of the plasma CVD apparatus, silane with a flow rate of 160 sccm and dinitrogen monoxide with a flow rate of 4000 sccm which were used as a source gas were supplied to the treatment chamber, the pressure in the treatment chamber was 200 Pa, the substrate temperature was 220° C., and the high-frequency power of 1500 W was supplied to parallel plate electrodes.

Note that here, the IGZO film which was a CAAC-OS film is an IGZO film 973b illustrated in FIG. 19B.

Next, a method for forming the samples C3 illustrated in FIG. 19C is described.

The samples C3 were formed by heating samples C2 at 350° C. for one hour. Note that here, the IGZO film which was a CAAC-OS film is an IGZO film 973c illustrated in FIG. 19C.

Next, ESR measurement was performed on the samples C1 to C3. In the ESR measurement performed at a predetermined temperature, a value of a magnetic field ($H_0$) where a microwave is absorbed is used for an equation $g=h\nu/\beta H_0$, so that a parameter of a g-factor can be obtained. Note that the frequency of the microwave is denoted by $\nu$, and the Planck constant and the Bohr magneton are denoted by, respectively, h and $\beta$ which are both constants.

Here, the ESR measurement was performed under the following conditions. The measurement temperature was room temperature (25° C.), the high-frequency power (power of microwaves) of 9.4 GHz was 20 mW, and the direction of a magnetic field was parallel to a surface of each of the IGZO films in the samples. Note that the lower limit of the detection of the spin densities of a spin in which a signal is found at g (g-factor) of around 1.93 due to oxygen vacancies in the IGZO film was $2.2\times10^{16}$ spins/cm$^3$.

Figure 20A:
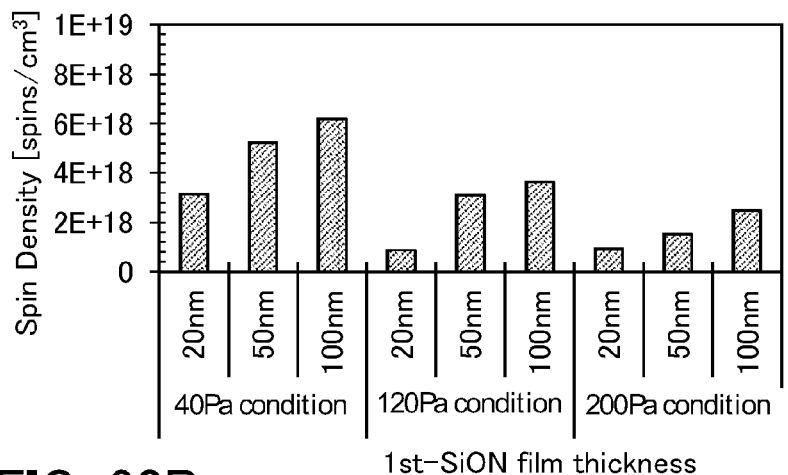
FIGS. 20A to 20C show results of ESR measurement in Example 3.
Figure 20B:
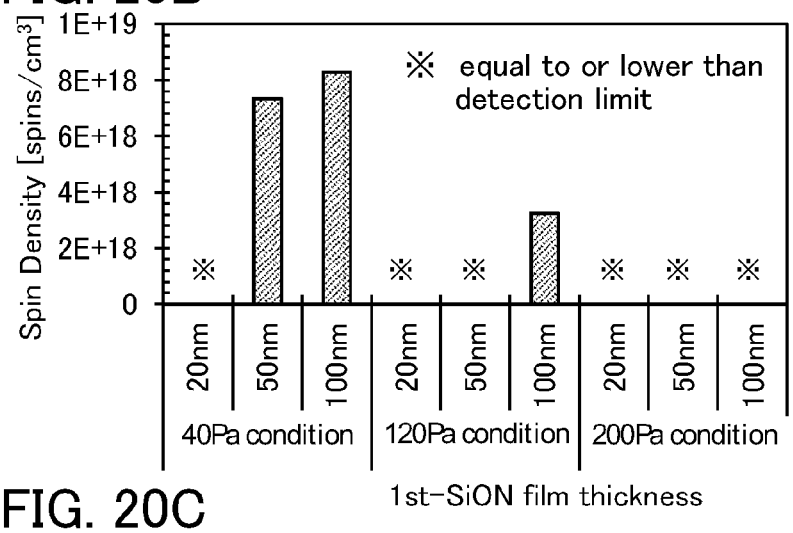
Figure 20C:
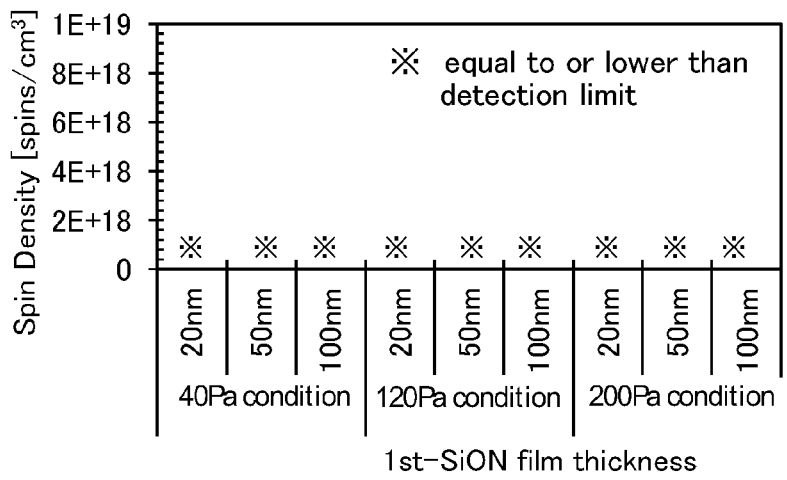

FIGS. 20A to 20C show spin densities of a spin in which a signal is found at a g-factor of around 1.93. FIG. 20A shows spin densities in the samples C1, FIG. 20B shows spin densities in the samples C2, and FIG. 20C shows spin densities in the samples C3.

Figure 21:
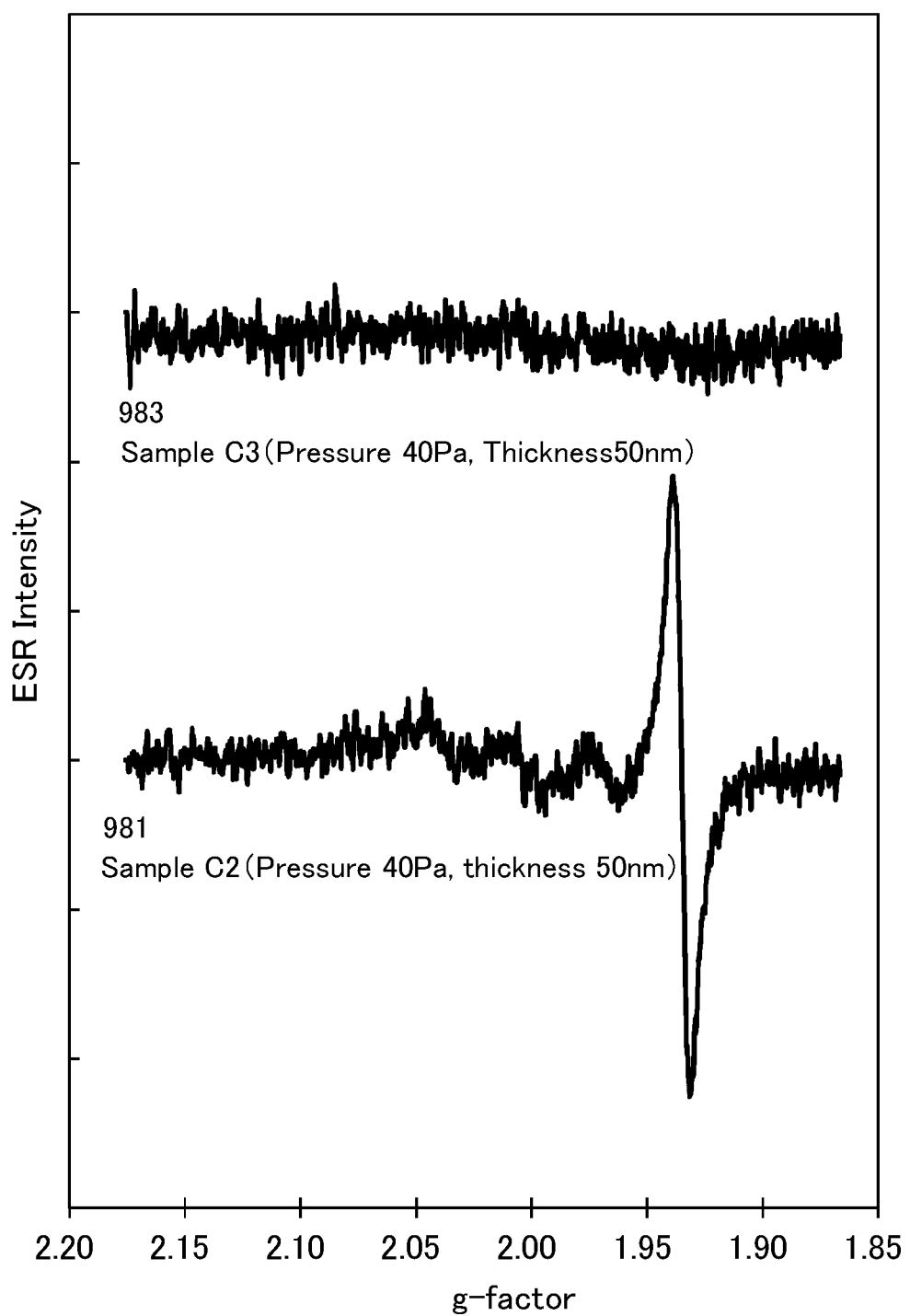
FIG. 21 shows first derivative curves obtained by ESR measurements in Example 3.

Moreover, the IGZO films included in one of the samples C2 and one of the samples C3 shown in FIGS. 20B and 20C were evaluated by ESR and their first derivative curves are shown in FIG. 21.

A curve 981 is a first derivative curve of a sample C2 in which a 50-nm-thick silicon oxynitride film 975 was formed under the film formation conditions of the pressure of 40 Pa.

A curve 983 is a first derivative curve of a sample C3 in which a 50-nm-thick silicon oxynitride film 975 was formed under the film formation conditions of the pressure of 40 Pa.

It is found from FIG. 21 that, in the sample C2, a signal having symmetry due to an oxygen vacancy is detected at a g-factor of around 1.93, which means that the IGZO film contains an oxygen vacancy. On the other hand, it is found that, in the sample C3, a signal having symmetry due to an oxygen vacancy is not detected at a g-factor of around 1.93 (i.e., the amount of oxygen vacancies was less than or equal to the lower limit of detection) and that the amount of oxygen vacancies in the IGZO film cannot be detected.

It is found from FIG. 20A that as the thickness of the silicon oxynitride film 975 is larger or the film formation pressure is lower, the amount of oxygen vacancies in the IGZO film 973*a* increases.

It is found from FIG. 20B that, in most of the samples where the silicon oxynitride film 977 is formed over the silicon oxynitride film 975, the amount of oxygen vacancies in the IGZO film 973*b* is less than or equal to the lower limit of detection, though the amount of oxygen vacancies increases in some samples.

This is because oxygen vacancies in the IGZO film 973*b* are reduced as follows: the silicon oxynitride film 977 which is an oxide insulating film which contains oxygen at a higher proportion than the stoichiometric composition (also referred to as excess oxygen) is formed over the silicon oxynitride film 975, so that excess oxygen contained in the silicon oxynitride film 977 is diffused into the IGZO film 973*b* through the silicon oxynitride film 975.

It is found from FIG. 20C that the amount of oxygen vacancies in the IGZO film 973*c* is less than or equal to the lower limit of detection by the heat treatment performed after the silicon oxynitride film 977 is formed over the silicon oxynitride film 975.

This is because oxygen vacancies in the IGZO film 973*c* are reduced as follows: the silicon oxynitride film 977 which is an oxide insulating film which contains oxygen at a higher proportion than the stoichiometric composition (also referred to as excess oxygen) is formed over the silicon oxynitride film 975, so that excess oxygen contained in the silicon oxynitride film 977 is diffused into the IGZO film 973*c* through the silicon oxynitride film 975.

As described above, the amount of oxygen vacancies in an oxide semiconductor film can be reduced by stacking a silicon oxynitride film over the oxide semiconductor film. Moreover, with application of the structure to a transistor, as shown in Example 1, the transistor in which the threshold voltage is shifted in the positive direction and the amount of change in threshold voltage is less than or equal to 2.5 V can be manufactured.

This application is based on Japanese Patent Application serial no. 2012-124605 filed with Japan Patent Office on May 31, 2012, the entire contents of which are hereby incorporated by reference.

What is claimed is:

1. A light-emitting device comprising:
    a light-emitting element;
    a transistor comprising a source, a drain and a gate, one of the source and the drain being electrically connected to the light-emitting element;
    a first switch and a capacitor connected in series between the gate and the one of the source and the drain;
    a voltage control circuit; and
    another switch electrically connected between the voltage control circuit and the one of the source and the drain,
    wherein the voltage control circuit is configured to control a potential to be applied to the one of the source and the drain so that a difference between a threshold voltage of the transistor and a voltage between the gate and the one of the source and the drain would be lower than or equal to 8 V,
    wherein the light-emitting device is configured to obtain the threshold voltage of the transistor and simultaneously writing data of a signal to the capacitor.

2. The light-emitting device according to claim 1,
    wherein the potential applied to the one of the source and the drain is a function of one of data regarding past use of the transistor and a monitor voltage threshold of a monitor transistor.

3. The light-emitting device according to claim 1,
    wherein the light-emitting device is configured so that the one of the source and the drain is at the potential at the beginning of a period during which the threshold voltage of the transistor is obtained.

4. The light-emitting device according to claim 1,
    wherein the threshold voltage of the transistor changes only in a positive direction in a BT stress test.

5. The light-emitting device according to claim 1,
    wherein the threshold voltage of the transistor changes only in a positive direction in each of a positive BT stress test, a negative BT stress test, a positive BT photostress test and a negative BT photostress test.

6. The light-emitting device according to claim 1,
    wherein the transistor includes an oxide semiconductor film comprising a channel formation region,
    wherein the transistor comprises an oxide insulating film containing oxygen at a higher proportion than a stoichiometric composition, and
    wherein the oxide insulating film is in direct contact with the oxide semiconductor film.

7. The light-emitting device according to claim 1,
    wherein the voltage control circuit comprises:
    a monitor portion;
    a corrected data storage portion; and
    a correction circuit outputting a voltage in accordance with data stored in the corrected data storage portion.

8. The light-emitting device according to claim 1,
    wherein the voltage control circuit comprises:
    a monitor transistor;
    a switch configured to control electric connection between a gate and a drain of the monitor transistor;
    a capacitor configured to store a potential between the gate and the drain of the monitor transistor; and
    a power supply generation circuit generating a potential in accordance with a monitor threshold voltage of the monitor transistor.

9. A display device comprising the light-emitting device according to claim 1.

10. The light-emitting device according to claim 1, further comprising a second switch and a third switch,
wherein the second switch is electrically connected to the gate of the transistor and to the first switch,
wherein the second switch is electrically connected to the third switch and to the capacitor through the first switch,
wherein the third switch is electrically connected to the capacitor, and
wherein the light-emitting device is configured to turn on simultaneously the second and the third switches and turn off simultaneously the second and the third switches.

11. A light-emitting device comprising:
a light-emitting element;
a first switch, a second switch, a third switch and a fourth switch;
a transistor comprising a source, a drain and a gate, one of the source and the drain being electrically connected to the light-emitting element;
a capacitor comprising a first electrode electrically connected to one of the source and the drain, and a second electrode electrically connected to the gate through the first switch;
a first wiring electrically connected to the gate through the second switch and to the second electrode of the capacitor through the first and the second switches;
a second wiring electrically connected to the second electrode of the capacitor through the third switch and to the second switch through the third and the first switches; and
a voltage control circuit electrically connected to the one of the source and the drain through the fourth switch,
wherein the voltage control circuit is configured to control a potential applied to the one of the source and the drain so that a difference between a threshold voltage of the transistor and a voltage between the gate and the one of the source and the drain is lower than or equal to 8 V.

12. The light-emitting device according to claim 11, wherein the threshold voltage of the transistor changes only in a positive direction in each of a positive BT stress test, a negative BT stress test, a positive BT photostress test and a negative BT photostress test.

13. The light-emitting device according to claim 11, wherein the transistor includes an oxide semiconductor film comprising a channel formation region,
wherein the transistor comprises an oxide insulating film containing oxygen at a higher proportion than a stoichiometric composition, and
wherein the oxide insulating film is in direct contact with the oxide semiconductor film.

14. The light-emitting device according to claim 11, wherein the voltage control circuit comprises:
a monitor portion;
a corrected data storage portion; and
a correction circuit outputting a voltage in accordance with data stored in the corrected data storage portion.

15. A display device comprising the light-emitting device according to claim 11.

16. The light-emitting device according to claim 11, wherein the light-emitting device is configured so that the second and the third switches are turned on simultaneously and turned off simultaneously.

17. The light-emitting device according to claim 11, wherein the light-emitting device is configured so that the second and the third switches are controlled by a potential of a same line.

18. A light-emitting device comprising:
a light-emitting element;
a first switch, a second switch, a third switch and a fourth switch;
a transistor comprising a source, a drain and a gate, one of the source and the drain being electrically connected to the light-emitting element;
a capacitor comprising a first electrode electrically connected to one of the source and the drain, and a second electrode electrically connected to the gate through the first switch;
a first wiring electrically connected to the gate through the second switch and to the second electrode of the capacitor through the first and the second switches;
a second wiring electrically connected to the second electrode of the capacitor through the third switch and to the second switch through the third and the first switches; and
a voltage control circuit electrically connected to the one of the source and the drain through the fourth switch.

19. The light-emitting device according to claim 18, wherein the light-emitting device is configured to turn on simultaneously the second and the third switches and turn off simultaneously the second and the third switches.

20. The light-emitting device according to claim 18, wherein the light-emitting device is configured so that the second and the third switches are controlled by a potential of a same line.

* * * * *